(12) United States Patent
Suematsu et al.

(10) Patent No.: US 8,486,577 B2
(45) Date of Patent: Jul. 16, 2013

(54) FUEL CELL SYSTEM

(75) Inventors: Keigo Suematsu, Susono (JP); Tatsuaki Yokoyama, Susono (JP); Koji Katano, Toyota (JP); Nobuhiro Tomosada, Kodaira (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1339 days.

(21) Appl. No.: 11/994,659

(22) PCT Filed: Jul. 26, 2006

(86) PCT No.: PCT/JP2006/315258
§ 371 (c)(1),
(2), (4) Date: Jan. 4, 2008

(87) PCT Pub. No.: WO2007/013668
PCT Pub. Date: Feb. 1, 2007

(65) Prior Publication Data
US 2009/0035612 A1 Feb. 5, 2009

(30) Foreign Application Priority Data
Jul. 27, 2005 (JP) .................................. 2005-217119

(51) Int. Cl.
H01M 8/04 (2006.01)
(52) U.S. Cl.
USPC ............ 429/446; 429/428; 429/443; 429/444
(58) Field of Classification Search
USPC ................................. 429/428–451
See application file for complete search history.

(56) References Cited

U.S. PATENT DOCUMENTS

| 4,680,240 | A * | 7/1987 | Furukawa et al. | 429/429 |
| 2003/0104261 | A1* | 6/2003 | Schnitzer et al. | 429/34 |
| 2004/0099048 | A1 | 5/2004 | Miura et al. | |
| 2004/0185313 | A1* | 9/2004 | Halter et al. | 429/22 |
| 2007/0111058 | A1* | 5/2007 | Yoshida | 429/22 |
| 2007/0224473 | A1 | 9/2007 | Suematsu et al. | |

FOREIGN PATENT DOCUMENTS

| DE | 103 54 440 A1 | 7/2004 |
| JP | 9 22711 | 1/1997 |
| JP | 11 108730 | 4/1999 |
| JP | 2000 274311 | 10/2000 |

(Continued)

*Primary Examiner* — Raymond Alejandro
*Assistant Examiner* — Helen McDermott
(74) *Attorney, Agent, or Firm* — Oblon, Spivak, McClelland, Maier & Neustadt, L.L.P.

(57) ABSTRACT

In a fuel cell system of the invention, a hydrogen leakage detection process closes a shutoff valve, which shuts off a supply of hydrogen from a hydrogen supply unit into a hydrogen supply flow path, and opens a pressure regulator, which reduces a pressure of hydrogen in the hydrogen supply flow path, so as to keep the hydrogen supply flow path in a state with no pressure regulation and make the fuel cell system in a leakage detectable state. In this leakage detectable state, the hydrogen leakage detection process measures at least one of a pressure and a flow rate as a state quantity of hydrogen in the hydrogen supply flow path that feeds the supply of hydrogen to fuel cells. The hydrogen leakage detection process analyzes a detected behavior of the state quantity in the leakage detectable process and specifies the occurrence of a hydrogen leakage in the downstream of the hydrogen supply unit. This arrangement enables highly accurate detection of a hydrogen leakage in the fuel cell system with the pressure regulator provided in the hydrogen supply flow path.

8 Claims, 15 Drawing Sheets

FOREIGN PATENT DOCUMENTS

| | | |
|---|---|---|
| JP | 2003 148252 | 5/2003 |
| JP | 2003148252 A * | 5/2003 |
| JP | 2003 308866 | 10/2003 |
| JP | 2003 308868 | 10/2003 |
| JP | 2004 95425 | 3/2004 |
| JP | 2004 281132 | 10/2004 |
| JP | 2005190824 A * | 7/2005 |
| JP | 2006 179469 | 7/2006 |

* cited by examiner

Fig.3

ABNORMALITY DETECTION TABLE

| | | FLOW RATE Q | | | |
|---|---|---|---|---|---|
| | | DOWNSTREAM FLOW | SUBSTANTIALLY ZERO | UPSTREAM FLOW | OMISSION OF MEASUREMENT |
| PRESSURE P3 | INCREASE | LEAKAGE OF MAIN SHUTOFF VALVE | LEAKAGE OF MAIN SHUTOFF VALVE | SENSOR ABNORMALITY | LEAKAGE OF MAIN SHUTOFF VALVE |
| | NO VARIATION | SENSOR ABNORMALITY | NOTHING ABNORMAL | SENSOR ABNORMALITY | NOTHING ABNORMAL |
| | DECREASE | LEAKAGE IN DOWNSTREAM | LEAKAGE IN FLOW PATH | LEAKAGE IN UPSTREAM | LEAKAGE IN FLOW PATH |
| | OMISSION OF MEASUREMENT | LEAKAGE IN DOWNSTREAM | NOTHING ABNORMAL | LEAKAGE IN UPSTREAM | |

TIME ELAPSED SINCE CLOSURE OF MAIN SHUTOFF VALVE

FUEL CELL SYSTEM

TECHNICAL FIELD

The present invention relates to a fuel cell system. More specifically the invention pertains to a technique of detecting a leakage of hydrogen gas supplied to fuel cells.

BACKGROUND ART

In a fuel cell system that generates electricity with supplies of hydrogen and oxygen to fuel cells, various techniques of detecting a leakage of hydrogen supplied to anodes of the fuel cells have been proposed to enhance the safety of the fuel cell system.

One proposed technique of leakage detection disclosed in JP-A-2003-148252 estimates a quantity of pressure decrease in a hydrogen supply flow path from a total quantity of hydrogen as the sum of the quantity of hydrogen consumed for power generation by the fuel cells and the quantity of unconsumed hydrogen discharged from the fuel cells. The leakage detection technique then compares the estimated quantity of pressure decrease with an actual quantity of pressure decrease measured by a pressure sensor and detects the occurrence of a hydrogen leakage in the hydrogen supply flow path based on the result of the comparison.

Other known techniques of detecting a gas leakage are disclosed in, for example, JP-A-11-108730, JP-A-2003-308868, and JP-A-2003-308866.

In the general structure of the fuel cell system, a pressure regulator is provided in the hydrogen supply flow path to reduce the pressure of high-pressure hydrogen supplied from a hydrogen tank. During power generation by the fuel cells, the pressure level in the upstream of the pressure regulator is different from the pressure level in the downstream of the pressure regulator. In the occurrence of a hydrogen leakage at a specific position, the pressure sensor may have difficulty in measuring the quantity of pressure decrease of hydrogen. For example, the pressure sensor is provided in the upstream of the pressure regulator, and a hydrogen leakage occurs in the downstream of the pressure regulator. In this case, the pressure regulator interferes with transmission of a pressure variation accompanied with the hydrogen leakage occurring in the downstream of the pressure regulator. The pressure sensor located in the upstream of the pressure regulator is thus unable to accurately detect the pressure variation. The pressure variation in the downstream of the pressure regulator is transmitted to the upstream only after the continuous hydrogen leakage in the downstream of the pressure regulator decreases the pressure to or below a predetermined level to open the pressure regulator.

DISCLOSURE OF THE INVENTION

There is accordingly a need of ensuring highly accurate detection of a hydrogen leakage in a fuel cell system with a pressure regulator provided in a hydrogen supply flow path.

In order to satisfy at least part of the above and the other related demands, the present invention is directed to a fuel cell system having fuel cells. The fuel cell system includes: a hydrogen supply unit that feeds a supply of hydrogen to the fuel cells; a hydrogen supply flow path that connects the hydrogen supply unit to the fuel cells; a shutoff valve that shuts off the supply of hydrogen from the hydrogen supply unit into the hydrogen supply flow path; a pressure regulator that is provided in the hydrogen supply flow path to reduce a pressure of hydrogen supplied from the hydrogen supply unit; a state quantity measurement unit that measures at least one of a pressure and a flow rate as a state quantity of hydrogen in the hydrogen supply flow path; a state control module that closes the shutoff valve and opens the pressure regulator to keep the hydrogen supply flow path in a state with no pressure regulation and make the fuel cell system in a leakage detectable state; and a leakage detection module that analyzes a behavior of the state quantity detected by the state quantity measurement unit in the leakage detectable state and accordingly specifies occurrence of a hydrogen leakage in the downstream of the hydrogen supply unit.

The fuel cell system of the invention detects the occurrence of a hydrogen leakage after the pressure regulator is opened to keep the hydrogen supply flow path in the state with no pressure regulation. Even when a hydrogen leakage occurs on the opposite side of the state quantity measurement unit across the pressure regulator, the fuel cell system of the invention can accurately detect a pressure variation or a flow rate variation accompanied with the hydrogen leakage. The fuel cell system of this arrangement enables highly accurate detection of the occurrence of a hydrogen leakage.

In one aspect of the fuel cell system of the invention, the state quantity measurement unit measures the flow rate as the state quantity of the hydrogen. The leakage detection module includes at least either one of: a module of specifying occurrence of a hydrogen leakage in the downstream of the state quantity measurement unit, in response to detection of a downstream flow of the hydrogen by the state quantity measurement unit as the behavior of the state quantity; and a module of specifying occurrence of a hydrogen leakage in the upstream of the state quantity measurement unit, in response to detection of an upstream flow of the hydrogen by the state quantity measurement unit as the behavior of the state quantity.

The fuel cell system of this arrangement enables estimation of the location of a hydrogen leakage according to a flow rate variation accompanied with the hydrogen leakage.

In another aspect of the fuel cell system of the invention, the state quantity measurement unit measures the pressure as the state quantity of the hydrogen. The leakage detection module includes at least either one of: a module of specifying occurrence of a hydrogen leakage from the closed shutoff valve into the hydrogen supply flow path, in response to detection of a pressure increase by the state quantity measurement unit as the behavior of the state quantity; and a module of specifying occurrence of a hydrogen leakage in the downstream of the shutoff valve, in response to detection of a pressure decrease by the state quantity measurement unit as the behavior of the state quantity.

The fuel cell system of this arrangement enables estimation of the location of a hydrogen leakage according to a pressure variation accompanied with the hydrogen leakage.

In still another aspect of the fuel cell system of the invention, the state quantity measurement unit measures both the flow rate and the pressure as state quantities of the hydrogen. The leakage detection module includes at least any one of: a module of specifying occurrence of a hydrogen leakage from the closed shutoff valve into the hydrogen supply flow path, in response to detection of a pressure increase and a downstream flow of the hydrogen by the state quantity measurement unit as behaviors of the state quantities; a module of specifying an abnormality of the state quantity measurement unit, in response to detection of a pressure increase and an upstream flow of the hydrogen by the state quantity measurement unit as the behaviors of the state quantities; a module of specifying occurrence of a hydrogen leakage in the downstream of the state quantity measurement unit, in response to detection of a pressure decrease and a downstream flow of the hydrogen by the state quantity measurement unit as the behaviors of the state quantities; and a module of specifying occurrence of a hydrogen leakage in the upstream of the state quantity measurement unit, in response to detection of a pressure decrease and an upstream flow of the hydrogen by the state quantity measurement unit as the behaviors of the state quantities.

The fuel cell system of this arrangement enables estimation of the location of a hydrogen leakage according to a combination of a flow rate variation and a pressure variation accompanied with the hydrogen leakage.

In another aspect of the fuel cell system of the invention, the state quantity measurement unit measures the flow rate as the state quantity of the hydrogen. The leakage detection module includes a module of specifying occurrence of a hydrogen leakage when the flow rate of the hydrogen measured by the state quantity measurement unit as the state quantity of the hydrogen is higher than a reference flow rate of hydrogen transmitted from anodes to cathodes across electrolyte membranes in the fuel cells.

The fuel cell system of this arrangement enables detection of the occurrence of a hydrogen leakage by taking into account a cross leaking phenomenon where hydrogen is transmitted from the anodes to the cathodes across the electrolyte membranes in the fuel cells.

In still another aspect of the fuel cell system of the invention, the leakage detection module measures a time elapsed until the pressure regulator is opened to make the hydrogen supply flow path in the state with no pressure regulation since the closure of the shutoff valve by the state control module. The leakage detection module includes at least either one of: a module of specifying occurrence of a hydrogen leakage when the elapsed time is shorter than a reference time required for opening the pressure regulator and making the hydrogen supply flow path in the state with no pressure regulation in a normal state with no hydrogen leakage; and a module of specifying occurrence of a hydrogen leakage from the closed shutoff valve into the hydrogen supply flow path when the elapsed time is longer than the reference time.

The fuel cell system of this arrangement enables estimation of the location of a hydrogen leakage according to the time elapsed until the pressure regulator is opened to make the hydrogen flow path in the state with no pressure regulation.

In another aspect of the fuel cell system of the invention, the state quantity measurement unit measures the flow rate as the state quantity of the hydrogen. The leakage detection module includes a module of computing a time variation of the flow rate after the pressure regulator is opened to make the hydrogen supply flow path in the state with no pressure regulation and specifying occurrence of a hydrogen leakage when the computed time variation is less than a reference time variation in a normal state with no hydrogen leakage.

The fuel cell system of this arrangement enables detection of the occurrence of a hydrogen leakage according to the time variation of the flow rate of hydrogen after the pressure regulator is opened.

In one preferable embodiment of the invention, the fuel cell system further has a pressure sensor that measures a pressure of the hydrogen in the hydrogen supply flow path in the downstream of the pressure regulator. The state control module makes the fuel cell system in the leakage detectable state by once opening the shutoff valve to allow the supply of hydrogen into the hydrogen supply flow path, and subsequently closing the shutoff valve when the pressure of the hydrogen in the downstream of the pressure regulator measured by the pressure sensor reaches a preset object value for opening the pressure regulator and keeping the hydrogen supply flow path in the state with no pressure regulation.

The fuel cell system of this arrangement opens the pressure regulator at a timing of opening the shutoff valve, for example, at a system activation time, and detects the occurrence of a hydrogen leakage.

In another preferable embodiment of the invention, the fuel cell system further has a pressure sensor that measures a pressure of the hydrogen in the hydrogen supply flow path in the downstream of the pressure regulator. The state control module makes the fuel cell system in the leakage detectable state by closing the shutoff valve and consuming the hydrogen in the hydrogen supply flow path until the pressure of the hydrogen in the downstream of the pressure regulator measured by the pressure sensor reaches a preset object value for opening the pressure regulator and keeping the hydrogen supply flow path in the state with no pressure regulation.

The fuel cell system of this arrangement opens the pressure regulator at a timing of closing the shutoff valve, for example, at a system stop time or in the state of intermittent operation, and detects the occurrence of a hydrogen leakage.

In still another preferable embodiment of the invention, the fuel cell system further has: a downstream pressure sensor that measures a pressure of the hydrogen in the hydrogen supply flow path in the downstream of the pressure regulator; and an upstream pressure sensor that measures a pressure of the hydrogen in the hydrogen supply flow path in the upstream of the pressure regulator. The state control module makes the fuel cell system in the leakage detectable state by closing the shutoff valve and consuming the hydrogen in the hydrogen supply flow path until the pressure of the hydrogen measured by the downstream pressure sensor is equal to the pressure measured by the upstream pressure sensor.

The fuel cell system of this arrangement equalizes the pressure level in the upstream of the pressure regulator and the pressure level in the downstream of the pressure regulator to open the pressure regulator and detects the occurrence of a hydrogen leakage.

In the fuel cell system of the above embodiment, the leakage detection module may have a mechanism of activating power generation by the fuel cells to consume the hydrogen in the hydrogen supply flow path. The leakage detection module may alternatively have a mechanism of discharging the hydrogen from the fuel cells to consume the hydrogen in the hydrogen supply flow path.

Even when the hydrogen in the downstream of the pressure regulator has a high pressure, the fuel cell system having either of these mechanisms reduces the pressure of the hydrogen to open the pressure regulator.

In one preferable embodiment of the fuel cell system of the invention, the pressure regulator is a variable pressure regulator that directly adjusts an opening in response to an external control. The state control module controls the pressure regulator to open the pressure regulator and make the pressure regulator in the state without pressure regulation.

The fuel cell system of this arrangement opens the pressure regulator without consumption of hydrogen.

In another preferable embodiment of the fuel cell system of the invention, the hydrogen supply flow path has a buffer tank that is located between the shutoff valve and the state quantity measurement unit to temporarily store the hydrogen supplied from the hydrogen supply unit.

Even after the closure of the shutoff valve, hydrogen is continuously supplied from the buffer tank into the hydrogen supply flow path. The fuel cell system of this arrangement extends the time usable for detection of a hydrogen leakage and accordingly enhances the accuracy of leakage detection.

In another preferable embodiment of the invention, the fuel cell system has: a first pressure regulator and a second pressure regulator that are provided at two different positions on a downstream side and on an upstream side in the hydrogen supply flow path; and a second shutoff valve that is provided between the first pressure regulator and the second pressure regulator. The state quantity measurement unit is located between the second shutoff valve and the second pressure regulator. The state control module closes the second shutoff valve after closing the shutoff valve and keeping open the first pressure regulator and the second pressure regulator, so as to make the fuel cell system in the leakage detectable state. The leakage detection module detects occurrence of a hydrogen leakage from the hydrogen supply unit via the shutoff valve into the hydrogen supply flow path, based on the state quantity measured by the state quantity measurement unit.

The fuel cell system of this arrangement uses the state quantity measurement unit located between the two pressure regulators to detect a hydrogen leakage from the shutoff valve. The state quantity measurement unit provided in this location is not required to have a very high pressure resistance. A sensor having a high measurement accuracy is thus applicable to the state quantity measurement unit to accurately detect a hydrogen leakage from the shutoff valve.

The present invention is also directed to another fuel cell system having fuel cells. The fuel cell system includes: a hydrogen supply unit that feeds a supply of hydrogen to the fuel cells; a hydrogen supply flow path that connects the hydrogen supply unit to the fuel cells; a shutoff valve that shuts off the supply of hydrogen from the hydrogen supply unit into the hydrogen supply flow path; a pressure regulator that is provided in the hydrogen supply flow path to reduce a pressure of hydrogen supplied from the hydrogen supply unit; a state quantity measurement unit that measures at least one of a pressure and a flow rate as a state quantity of hydrogen in the hydrogen supply flow path; a state control module that closes the shutoff valve and opens the pressure regulator to equalize a pressure level in the upstream of the pressure regulator and a pressure level in the downstream of the pressure regulator and make the fuel cell system in a leakage detectable state; and a leakage detection module that analyzes a behavior of the state quantity detected by the state quantity measurement unit in the leakage detectable state and accordingly specifies occurrence of a hydrogen leakage in the downstream of the hydrogen supply unit.

The fuel cell system of the invention equalizes the pressure level in the upstream of the pressure regulator with the pressure level in the downstream of the pressure regulator. Even when a hydrogen leakage occurs on the opposite side of the state quantity measurement unit across the pressure regulator, the pressure variation or the flow rate variation accompanied with the hydrogen leakage is immediately transmitted to the state quantity measurement unit. The fuel cell system of this arrangement thus enables highly accurate detection of the occurrence of a hydrogen leakage.

The technique of the invention is also actualized by a leakage detection method of detecting a hydrogen leakage in the fuel cell system.

BRIEF DESCRIPTION OF THE DRAWINGS

FIG. 3 shows one example of an abnormality detection table;

BEST MODES OF CARRYING OUT THE INVENTION

Figure 1:
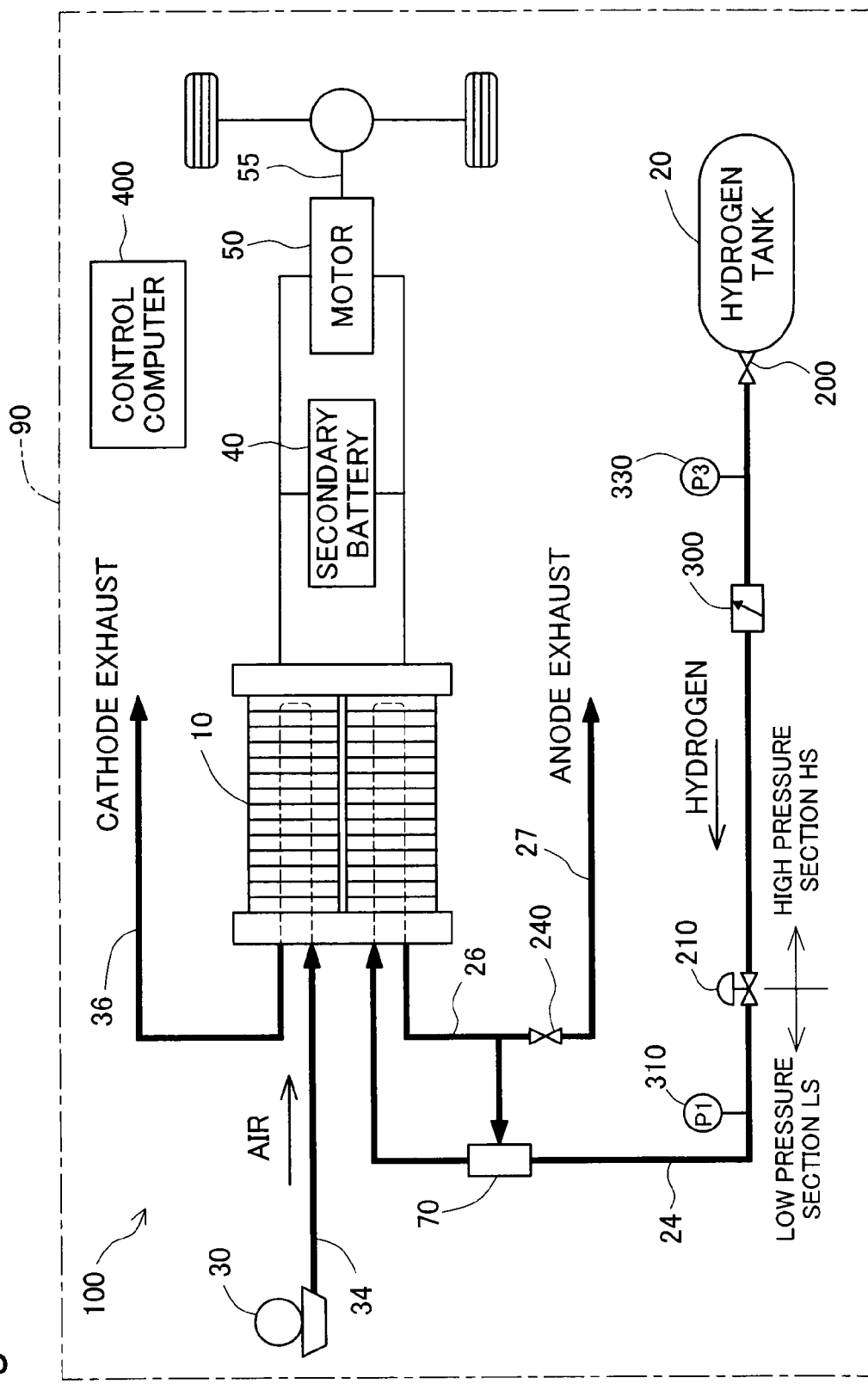
FIG. 1 schematically illustrates the general configuration of a fuel cell system 100 in a first embodiment of the invention.

In order to clarify the features, the functions, and the effects of the invention, some modes of carrying out the invention are described below in the following sequence as preferred embodiments with reference to the accompanied drawings:
A. First Embodiment
  (A1) General Configuration of Fuel Cell System
  (A2) Abnormality Detection Process at System Activation Time
  (A3) Another Flow of Abnormality Detection Process at System Activation Time
  (A4) Abnormality Detection Process in System Stop State
  (A5) Modifications of First Embodiment
B. Second Embodiment
  (B1) General Configuration of Fuel Cell System
  (B2) Abnormality Detection Process in System Stop State
  (B3) Another Flow of Abnormality Detection Process in System Stop State
A. First Embodiment
(A1) General Configuration of Fuel Cell System FIG. 1 schematically illustrates the general configuration of a fuel cell system 100 in a first embodiment of the invention. As illustrated, the fuel cell system 100 of the embodiment is mounted on a vehicle 90 and includes fuel cells 10 that generate electric power through electrochemical reaction of hydrogen and oxygen, a hydrogen tank 20 that stores high-pressure hydrogen gas, an air compressor 30 that feeds the air to the fuel cells 10, a secondary battery 40 that is charged with the electric power generated by the fuel cells 10, a motor 50 that drives an axle 55 with the electric power generated by the fuel cells 10 and the electric power discharged from the secondary battery 40, and a control computer 400 that controls the operations of the fuel cell system 100 and the vehicle 90.

The fuel cells 10 are polymer electrolyte fuel cells and have a stack structure as a lamination of multiple unit cells (not specifically shown). Each unit cell has a hydrogen electrode (anode) and an oxygen electrode (cathode) arranged across an electrolyte membrane. The electrochemical reaction of hydrogen and oxygen proceeds to generate electromotive force with a supply of hydrogen gas to the anodes of the respective unit cells and a supply of the oxygen-containing air to the cathodes of the respective unit cells. The electric power generated by the fuel cells 10 is supplied to the secondary battery 40 and the motor 50 connected with the fuel cells 10.

The air compressor 30 is connected to the respective cathodes of the fuel cells 10 via an air supply conduit 34 to supply the air to the cathodes of the fuel cells 10. The air exhaust (cathode exhaust) after the electrochemical reaction is flowed through a cathode exhaust conduit 36 to be discharged.

The hydrogen tank 20 stores high-pressure hydrogen gas of several tens MPa. The hydrogen tank 20 is equivalent to the hydrogen supply unit of the invention and is connected to the respective anodes of the fuel cells 10 via a hydrogen supply flow path 24. A main shutoff valve 200 is provided between the hydrogen tank 20 and the hydrogen supply flow path 24. The main shutoff valve 200 is equivalent to the shutoff valve of the invention and is opened and closed under control of the control computer 400. In the open position of the main shutoff valve 200, the supply of hydrogen gas is fed from the hydrogen tank 20 to the fuel cells 10 through the hydrogen supply flow path 24. In the closed position of the main shutoff valve 200, the flow of hydrogen gas is shut off. A hydrogen flowmeter 300 as a state quantity measurement unit and a pressure regulator 210 are provided in the hydrogen supply flow path 24 in this sequence closer to the hydrogen tank 20.

The high-pressure hydrogen gas supplied from the hydrogen tank 20 into the hydrogen supply flow path 24 is reduced to a predetermined pressure level by the pressure regulator 210. The predetermined pressure level after the pressure reduction is set to be a value suitable for power generation by the fuel cells 10. The pressure reduction by the pressure regulator 210 makes divisions of different pressure levels in the hydrogen supply flow path 24. In the description below, these divisions of different pressure levels in the hydrogen supply flow path 24 are represented by a low pressure section LS and a high pressure section HS as shown in FIG. 1. Pressure sensors 310 and 330 are provided respectively as state quantity measurement units in the low pressure section LS and in the high pressure section HS to measure the pressure of the hydrogen gas flowing through the respective sections LS and HS.

The hydrogen flowmeter 300 measures the flow rate of hydrogen gas flowing through the high pressure section HS in the upstream of the pressure regulator 210. The hydrogen flowmeter 300 is connected to the control computer 400. The hydrogen flowmeter 300 outputs a positive voltage in response to detection of a hydrogen flow toward the fuel cells 10 (a downstream flow), while outputting a negative voltage in response to detection of a hydrogen flow towards the hydrogen tank 20 (an upstream flow). The control computer 400 accordingly identifies the flow direction of hydrogen gas, based on the positive or negative sign of the voltage input from the hydrogen flowmeter 300.

An anode exhaust conduit 26 is linked to an outlet of the respective anodes of the fuel cells 10. The anode exhaust conduit 26 has two branches. One branch is connected to the low pressure section LS of the hydrogen supply flow path 24 via a circulator unit 70. The other branch is connected to an anode exhaust discharge conduit 27 via a purge valve 240. The circulator unit 70 may be, for example, an ejector or a pump. The anode exhaust may contain remaining hydrogen gas that has not been consumed for power generation by the fuel cells 10. The hydrogen gas-containing anode exhaust is circulated by the circulator unit 70 and is supplied again to the fuel cells 10 for the efficient use of hydrogen gas.

The purge valve 240 is opened at preset timings under control of the control computer 400. The anode exhaust generally contains impurities, such as nitrogen and water in the air transmitted from the cathodes through the electrolyte membranes in the respective fuel cells 10, in addition to the remaining hydrogen gas. The purge valve 240 is opened to purge out such impurities of the anode exhaust at regular intervals. The control computer 400 may estimate the concentration of the impurities in the anode exhaust, for example, based on the quantity of power generation by the fuel cells 10 and regulates the open timing of the purge valve 240.

The control computer 400 is equivalent to the state control module and the leakage detection module of the invention and includes a CPU, a ROM, a RAM, and an input/output port. The ROM stores a program for abnormality detection (described later) and programs for control of the operations of the vehicle 90 and the fuel cell system 100. The CPU executes these programs expanded in the RAM. The input/output port is connected with the hydrogen flowmeter 300, the pressure sensors 310 and 330, as well as the main shutoff valve 200, the purge valve 240, the air compressor 30, and an ignition switch (not shown).

(A2) Abnormality Detection Process at System Activation Time

Figure 2:
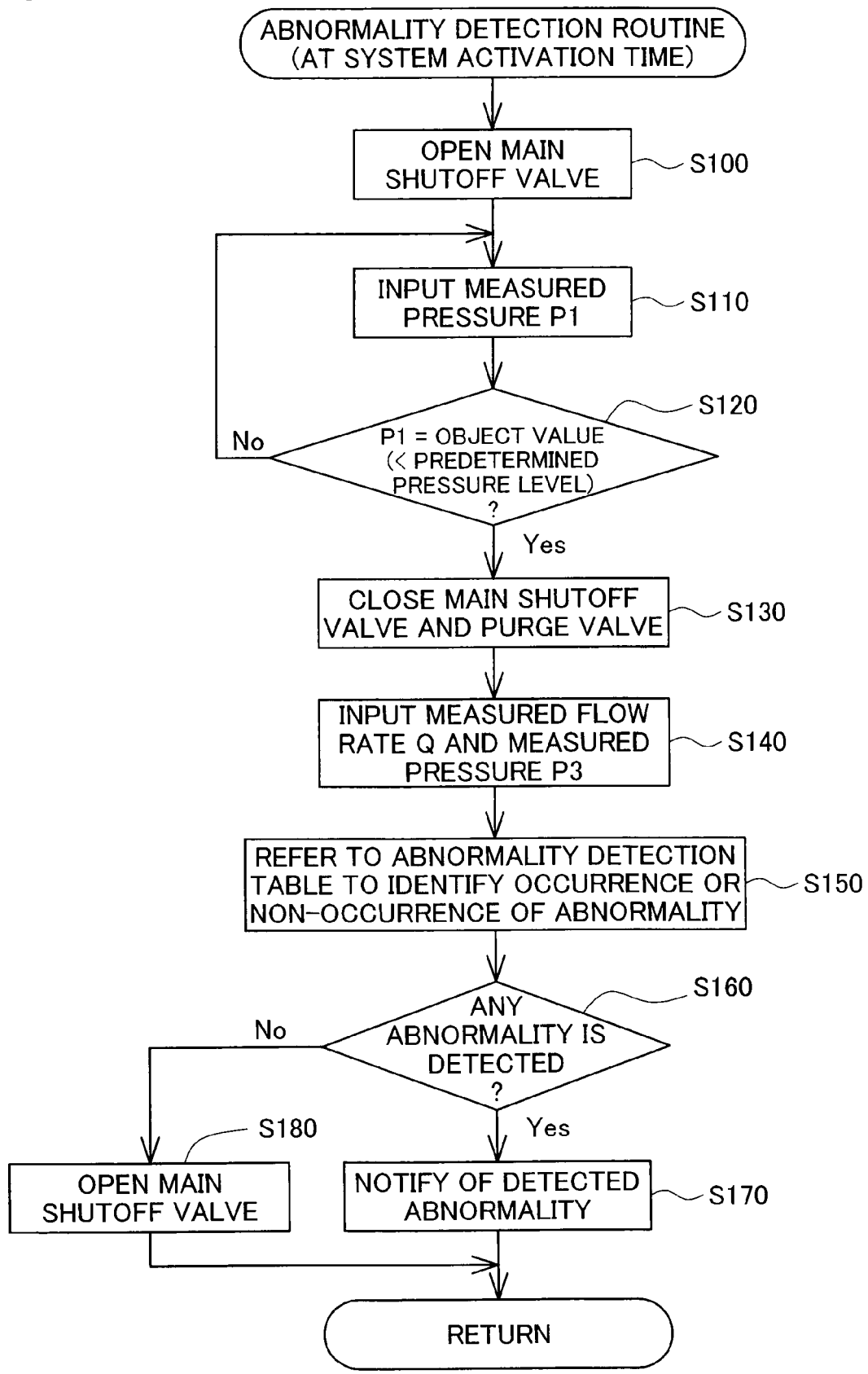
FIG. 2 is a flowchart showing an abnormality detection routine executed by a control computer 400 at the activation time of the fuel cell system 100.

FIG. 2 is a flowchart showing an abnormality detection routine executed by the control computer 400 at the activation time of the fuel cell system 100 in response to the driver's ON operation of the ignition switch. The abnormality detection routine is performed to detect any leakage of hydrogen gas fed to the fuel cells 10.

In the abnormality detection routine of FIG. 2, the control computer 400 first opens the main shutoff valve 200 (step S100) to supply the hydrogen gas from the hydrogen tank 20 into the hydrogen supply flow path 24. The control computer 400 inputs a pressure P1 measured in the low pressure section LS of the hydrogen supply flow path 24 in the downstream of the pressure regulator 210 by the pressure sensor 310 (step S110). The control computer 400 then determines whether the measured pressure P1 has reached a preset object value (step S120). The object value is lower than the predetermined pressure level set in the pressure regulator 210 and is set to fully open the pressure regulator 210 and keep the hydrogen supply flow path 24 in the state with no pressure regulation.

When the measured pressure P1 has not yet reached the preset object value (step S120: no), the abnormality detection routine goes back to step S110 and continues the supply of hydrogen from the hydrogen tank 20. When the measured pressure P1 has reached the preset object value (step S120: yes), on the other hand, the control computer 400 closes the main shutoff valve 200 and the purge valve 240 (step S130). This fully opens the pressure regulator 210 and shuts off the flow path connected to the anodes of the fuel cells 10. In this state of the fuel cell system 100 where the pressure regulator 210 is opened to keep the hydrogen supply flow path 24 in the state with no pressure regulation and the flow path connected to the anodes of the fuel cells 20 is shut off, the upstream section and the downstream section of the pressure regulator 210 have an identical pressure level. This state is hereafter referred to as 'leakage detectable state'. In the leakage detectable state, neither the pressure nor the flow rate of hydrogen gas in the flow path is varied without any hydrogen leakage. Hydrogen may be transmitted from the anodes to the cathodes via the electrolyte membranes in the fuel cells 10 (this phenomenon is hereafter referred to as 'cross leaking'). The abnormality detection process of this embodiment neglects the potential leakage of hydrogen by the cross leaking phenomenon on the assumption that the hydrogen leakage by cross linking is very small and negligible.

When the fuel cell system 100 is made in the leakage detectable state, the control computer 400 input a measured flow rate Q of hydrogen gas from the hydrogen flowmeter 300 and a pressure P3 measured in the hydrogen supply flow path 24 by the pressure sensor 330 (step S140). The control computer 400 refers to an abnormality detection table and identifies the occurrence or non-occurrence of abnormality, based on the measurement results of the flow rate Q and the pressure P3 (step S150). At step S140 in the abnormality detection routine, the pressure sensor 330 provided in the high pressure section HS is used to measure the pressure in the hydrogen supply flow path 24. Since the pressure regulator 210 is fully opened, the low pressure section LS and the high pressure section HS have an identical pressure level. The pressure sensor 310 provided in the low pressure section LS may thus alternatively be used to measure the pressure in the hydrogen supply flow path 24.

FIG. 3 shows one example of the abnormality detection table. In the illustrated example of the abnormality detection table, the occurrence or non-occurrence of an abnormality and the position of the abnormality are specified according to the behaviors of the flow rate Q and the pressure P3 in the leakage detectable state. Concrete examples of abnormality detection in various conditions of the pressure P3 are described below with reference to this abnormality detection table.

<In the Case of an Increase in Pressure P3>

In response to an increase in pressure P3 and a downstream flow rate Q, the control computer 400 detects a hydrogen leakage from the main shutoff valve 200 into the hydrogen supply flow path 24 (hereafter this phenomenon is referred to as 'leakage of main shutoff valve'). In response to an increase in pressure P3 and a substantially zero flow rate Q, it is determined that there is a leakage of main shutoff valve. This is because the hydrogen flowmeter 300 may detect a substantially zero flow rate Q when the hydrogen leakage is an extremely small amount. In response to an increase in pressure P3 and an upstream flow rate Q, the control computer 400 detects a sensor abnormality since this state is unpractical. When measurement of the flow rate Q is omitted at step S140 in the abnormality detection routine, a leakage of main shutoff valve may be detected in response to only an increase in pressure P3.

<In the Case of No Variation in Pressure P3>

In response to no variation in pressure P3 and a substantially zero flow rate Q, the control computer 400 detects no hydrogen leakage and thereby specifies 'nothing abnormal'. In response to no variation in pressure P3 and either a downstream flow rate Q or an upstream flow rate Q, the control computer 400 detects a sensor abnormality since such states are unpractical. When measurement of the flow rate Q is omitted at step S140 in the abnormality detection routine, 'nothing abnormal' may be specified in response to only no variation in pressure P3.

<In the Case of a Decrease in Pressure P3>

In response to a decrease in pressure P3 and a downstream flow rate Q, the control computer 400 detects a hydrogen leakage in the downstream of the hydrogen flowmeter 300. In response to a decrease in pressure P3 and an upstream flow rate Q, on the other hand, the control computer 400 detects a hydrogen leakage in the upstream of the hydrogen flowmeter 300. In response to a decrease in pressure P3 and a substantially zero flow rate Q, it is determined that there is a hydrogen leakage occurring somewhere in the flow path in the downstream of the main shutoff valve 200. This is because the hydrogen flowmeter 300 may detect a substantially zero flow rate Q when the hydrogen leakage is an extremely small amount. When measurement of the flow rate Q is omitted at step S140 in the abnormality detection routine, a hydrogen leakage occurring somewhere in the flow path in the downstream of the main shutoff valve 200 may be detected in response to only a decrease in pressure P3.

<In Omission of Measurement of Pressure P3>

A hydrogen leakage may be detected according to only the flow rate Q in the case of omission of measurement of the pressure P3 at step S140. In response to a downstream flow rate Q, the control computer 400 detects a hydrogen leakage in the downstream of the flowmeter 300. In response to an upstream flow rate Q, the control computer 400 detects a hydrogen leakage in the upstream of the flowmeter 300. In response to a substantially zero flow rate Q, it is determined that there is 'nothing abnormal'.

Referring back to the flowchart of FIG. 2, upon detection of any abnormality (step S160: yes) as the result of abnormality detection with reference to the abnormality detection table, the control computer 400 notifies the driver of detection of an abnormality by, for example, an alarm display on an instrument panel or an alarm sound (step S170) and terminates the abnormality detection routine. Upon detection of no abnormality (step S160: no), on the other hand, the control computer 400 opens the main shutoff valve 200 (step S180) to start power generation by the fuel cells 10 and terminates the abnormality detection routine.

In the course of supply of hydrogen gas to the fuel cells 10 at the system activation time, the pressure regulator 210 is fully opened on the condition that the hydrogen pressure in the low pressure section LS of the hydrogen supply flow path 24 is lower than the predetermined pressure level set in the pressure regulator 210. The low pressure section LS and the high pressure section HS of the hydrogen supply flow path 24 parted by the pressure regulator 210 accordingly have an identical pressure level. In the event of a flow rate variation or a pressure variation due to a hydrogen leakage in the low pressure section LS, the effect of the flow rate variation or the pressure variation is immediately transmitted to the high pressure section HS. The abnormality detection process of this embodiment can thus efficiently detect a hydrogen leakage occurring anywhere in the downstream of the hydrogen tank 20 by using the hydrogen flowmeter 300 and the pressure sensor 330 provided in the upstream of the pressure regulator 210.

(A3) Another Flow of Abnormality Detection Process at System Activation Time

Figure 4:
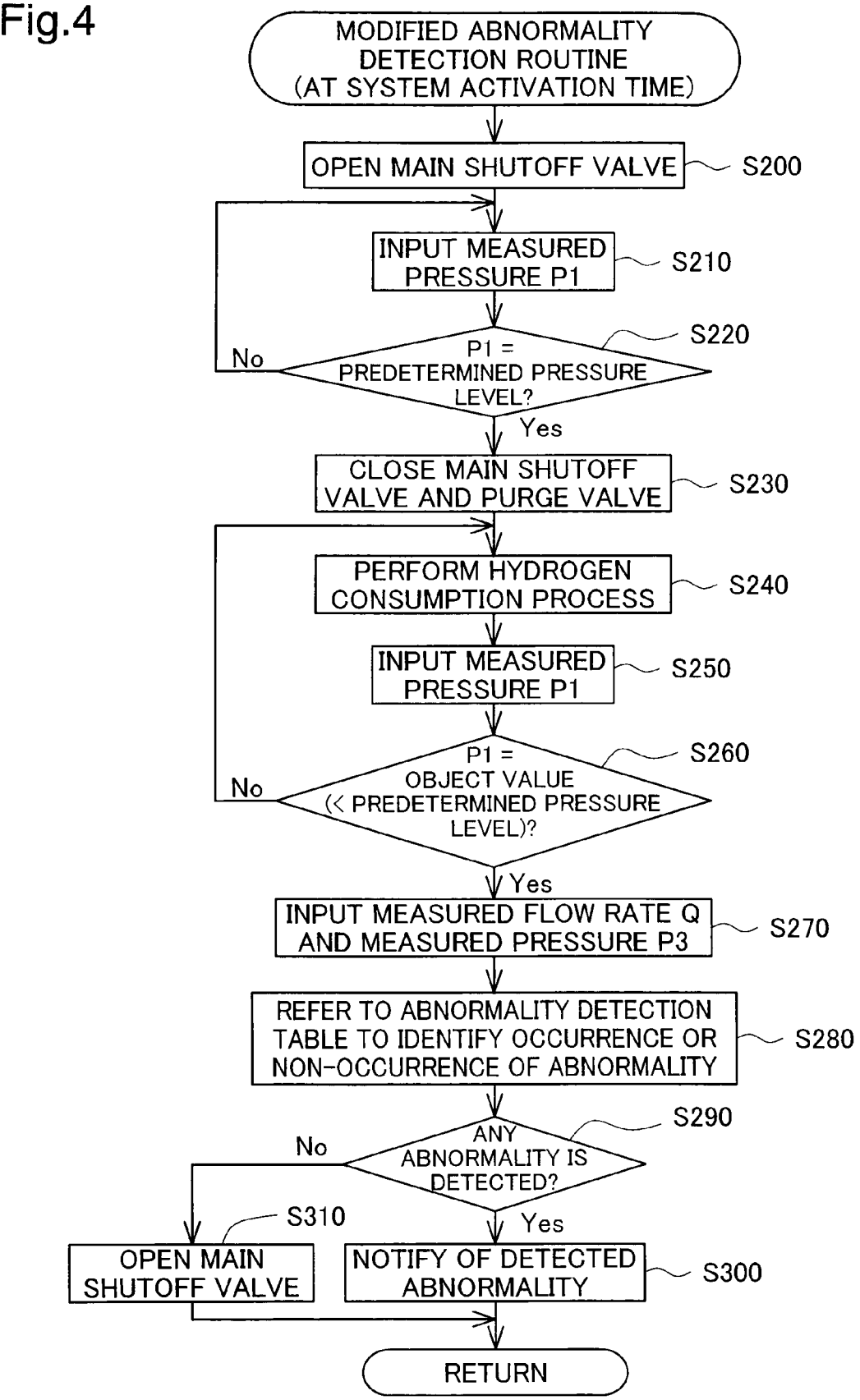
FIG. 4 is a flowchart showing another abnormality detection routine as a modification of the routine of FIG. 2.

FIG. 4 is a flowchart showing another abnormality detection routine as a modification of the routine of FIG. 2. The abnormality detection routine of FIG. 2 closes the main shutoff valve 200 and the purge valve 240 in response to an increase of the measured pressure P1 to the preset object value in the course of hydrogen supply and then performs the abnormality detection. The modified abnormality detection routine of FIG. 4, on the other hand, continues the hydrogen supply until an increase of the measured pressure P1 to the predetermined pressure level set in the pressure regulator 210, subsequently reduces the pressure P1 to the object value for fully opening the pressure regulator 210, and then performs the abnormality detection.

In the modified abnormality detection routine of FIG. 4, the control computer 400 first opens the main shutoff valve 200 (step S200) to supply the hydrogen gas into the hydrogen supply flow path 24. The control computer 400 inputs the pressure P1 measured in the downstream of the pressure regulator 210 by the pressure sensor 310 (step S210). The control computer 400 then determines whether the measured pressure P1 has reached the predetermined pressure level set in the pressure regulator 210 as the value suitable for power generation by the fuel cells 10 (step S220). When the measured pressure P1 has not yet reached the predetermined pressure level (step S220: no), the modified abnormality detection routine goes back to step S210 and continues the supply of hydrogen gas.

When the measured pressure P1 has reached the predetermined pressure level (step S220: yes), on the other hand, the control computer 400 closes the main shutoff valve 200 and the purge valve 240 (step S230) to shut off the flow path connected to the anodes of the fuel cells 10. In this state, since the pressure P1 has reached the predetermined pressure level, the pressure regulator 210 is closed. The low pressure section LS and the high pressure section HS of the hydrogen supply flow path 24 accordingly have different pressure levels.

The control computer 400 subsequently performs a hydrogen consumption process (step S240). The hydrogen consumption process is performed to consume hydrogen in the hydrogen supply flow path 24. The hydrogen consumption process, for example, starts power generation by the fuel cells 10 or opens the purge valve 240 for the purpose of hydrogen consumption.

After the hydrogen consumption process, the control computer 400 inputs the measured pressure P1 in the low pressure section LS (step S250) and determines whether the measured pressure P1 has been reduced to a preset object value (step S260). This object value is identical with the object value used in the abnormality detection routine of FIG. 2. Namely the object value is lower than the predetermined pressure level set in the pressure regulator 210 and is set to fully open the pressure regulator 210 and keep the hydrogen supply flow path 24 in the state with no pressure regulation. When the measured pressure P1 has not yet been reduced to the preset object value (step S260: no), the modified abnormality detection routine goes back to step S240 to continue the hydrogen consumption process.

When the measured pressure P1 has been reduced to the preset object value (step S260: yes), on the other hand, it is determined that the pressure regulator 210 is fully opened to keep the hydrogen supply flow path 24 in the state with no pressure regulation. Namely it is determined that the fuel cell system 100 is made in the leakage detectable state. The control computer 400 then inputs the measured flow rate Q of hydrogen gas from the hydrogen flowmeter 300 and the pressure P3 measured in the high pressure section HS of the hydrogen supply flow path 24 by the pressure sensor 330 (step S270). The control computer 400 refers to the abnormality detection table shown in FIG. 3 and identifies the occurrence or non-occurrence of abnormality (step S280). Upon detection of any abnormality (step S290: yes), the control computer 400 notifies the driver of detection of an abnormality (step S300) and terminates the modified abnormality detection routine. Upon detection of no abnormality (step S290: no), on the other hand, the control computer 400 opens the main shutoff valve 200 (step S310) to start power generation by the fuel cells 10 and terminates the modified abnormality detection routine.

As described above, the modified abnormality detection process first increases the pressure in the low pressure section LS of the hydrogen supply flow path 24 to the predetermined pressure level set in the pressure regulator 210 and subsequently performs the hydrogen consumption process to reduce the pressure to the preset object value for fully opening the pressure regulator 210. This modified abnormality detection process can efficiently detect a hydrogen leakage occurring even in the low pressure section LS by using the hydrogen flowmeter 300 and the pressure sensor 330 provided in the high pressure section HS of the hydrogen supply flow path 24.

At step S260 in the modified abnormality detection routine of FIG. 4, it is determined that the fuel cell system 100 is made in the leakage detectable state when the pressure P1 in the low pressure section LS after the hydrogen consumption process has been reduced to the preset object value. Another possible modification may compare the measured pressure P1 in the low pressure section LS with the measured pressure P3 in the high pressure section HS and determine that the pressure regulator 210 is opened to make the fuel cell system 100 in the leakage detectable state when the measured pressure P1 is equal to the measured pressure P3.

(A4) Abnormality Detection Process in System Stop State

Figure 5:
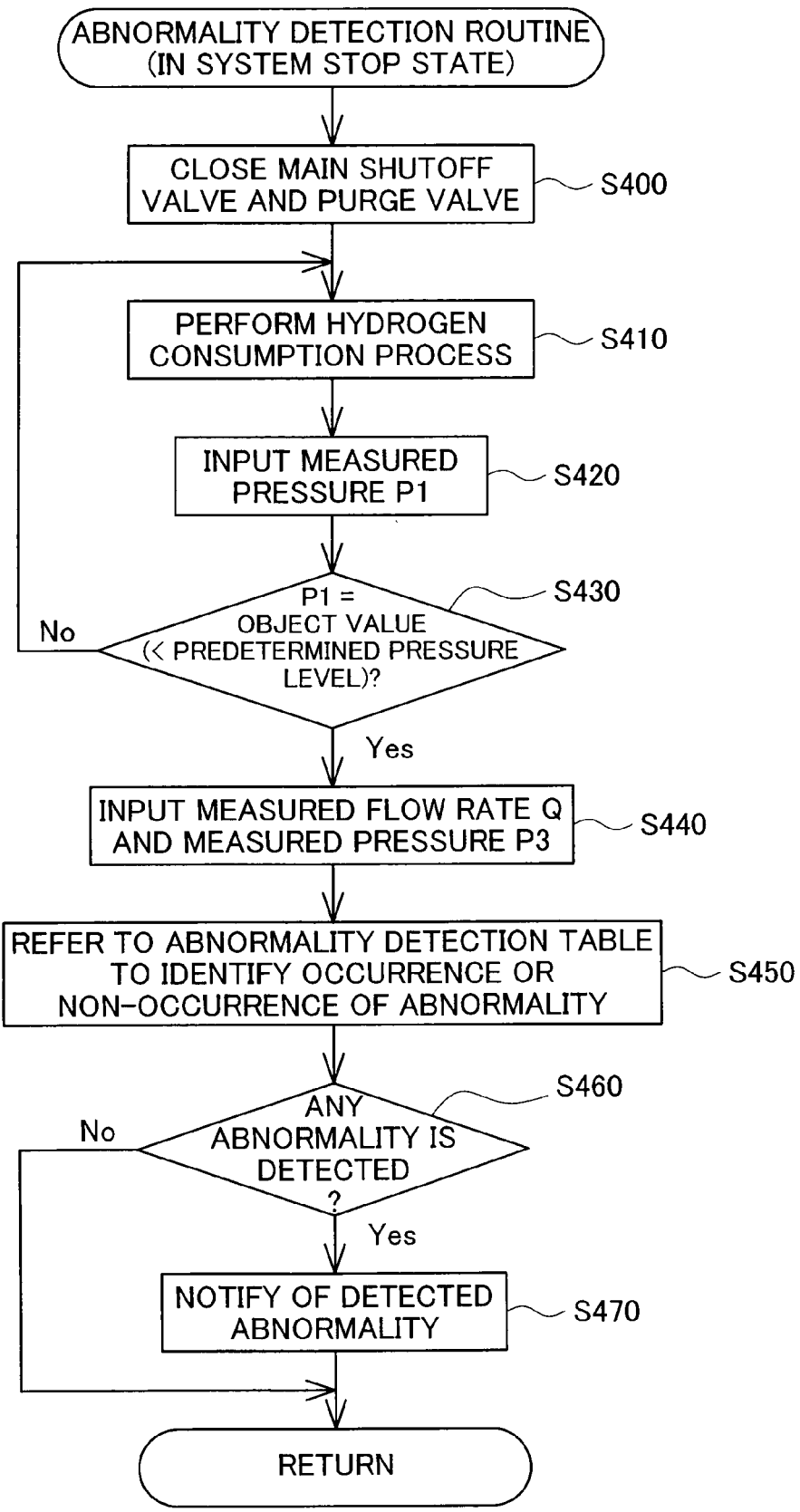
FIG. 5 is a flowchart showing an abnormality detection routine executed by the control computer 400 in the stop state of the fuel cell system 100.

FIG. 5 is a flowchart showing an abnormality detection routine executed by the control computer 400 in the stop state of the fuel cell system 100. The control computer 400 performs the abnormality detection routine of FIG. 5, for example, in response to the driver's OFF operation of the ignition switch to completely stop the vehicle 90 or in the state of intermittent operation where power generation by the fuel cells 10 is stopped and the vehicle 90 is driven with only the electric power accumulated in the secondary battery 40.

In the abnormality detection routine of FIG. 5, the control computer 400 first closes the main shutoff valve 200 and the purge valve 240 (step S400) to shut off the flow path connected to the anodes of the fuel cells 10. The control computer 400 subsequently performs the hydrogen consumption process (step S410) to reduce the pressure in the low pressure section LS of the hydrogen supply flow path 24. The control computer 400 inputs the measured pressure P1 in the low pressure section LS (step S420) and determines whether the measured pressure P1 has been reduced to the preset object value (step S430). When the measured pressure P1 has not yet been reduced to the preset object value (step S430: no), the abnormality detection routine goes back to step S410 to continue the hydrogen consumption process.

When the measured pressure P1 has been reduced to the preset object value (step S430: yes), on the other hand, it is determined that the pressure regulator 210 is fully opened to make the fuel cell system 100 in the leakage detectable state. The control computer 400 then inputs the measured flow rate Q of hydrogen gas from the hydrogen flowmeter 300 and the pressure P3 measured in the high pressure section HS of the hydrogen supply flow path 24 by the pressure sensor 330 (step S440). The control computer 400 refers to the abnormality detection table shown in FIG. 3 and identifies the occurrence or non-occurrence of abnormality (step S450). Upon detection of any abnormality (step S460: yes), the control computer 400 notifies the driver of detection of an abnormality (step S470) and terminates the abnormality detection routine.

Upon detection of any abnormality in the state of intermittent operation, the control computer 400 may restrict or prohibit the power generation by the fuel cells 10 and allows the vehicle 90 to be driven only with the electric power accumulated in the secondary battery 40. Upon detection of any abnormality in the completely stop state of the vehicle 90 by the driver's OFF operation of the ignition switch, the control computer 400 may prohibit restart of the vehicle 90 and restart of the fuel cells 10.

As described above, the abnormality detection routine of FIG. 5 performs the hydrogen consumption process to reduce the pressure in the low pressure section LS of the hydrogen supply flow path 24 and thereby fully opens the pressure regulator 210. Like the abnormality detection at the system activation time described above, the abnormality detection in the system stop state, for example, in the vehicle stop state or in the state of intermittent operation, can efficiently detect a hydrogen leakage occurring even in the low pressure section LS by using the hydrogen flowmeter 300 and the pressure sensor 330 provided in the high pressure section LS of the hydrogen supply flow path 24.

At step S430 in the abnormality detection routine of FIG. 5, it is determined that the fuel cell system 100 is made in the leakage detectable state when the pressure P1 in the low pressure section LS after the hydrogen consumption process has been reduced to the preset object value. Another possible modification may compare the measured pressure P1 in the low pressure section LS with the measured pressure P3 in the high pressure section HS and determine that the pressure regulator 210 is opened to make the fuel cell system 100 in the leakage detectable state when the measured pressure P1 is equal to the measured pressure P3.

(A5) Modifications of First Embodiment

FIRST MODIFIED EXAMPLE

In the structure of the first embodiment, the pressure regulator 210 has the fixed set pressure and the automatically unadjustable opening. In a first modified example of the first embodiment, a variable pressure regulator is adopted for the pressure regulator 210 and has an opening automatically adjustable under control of the control computer 400.

Figure 6:
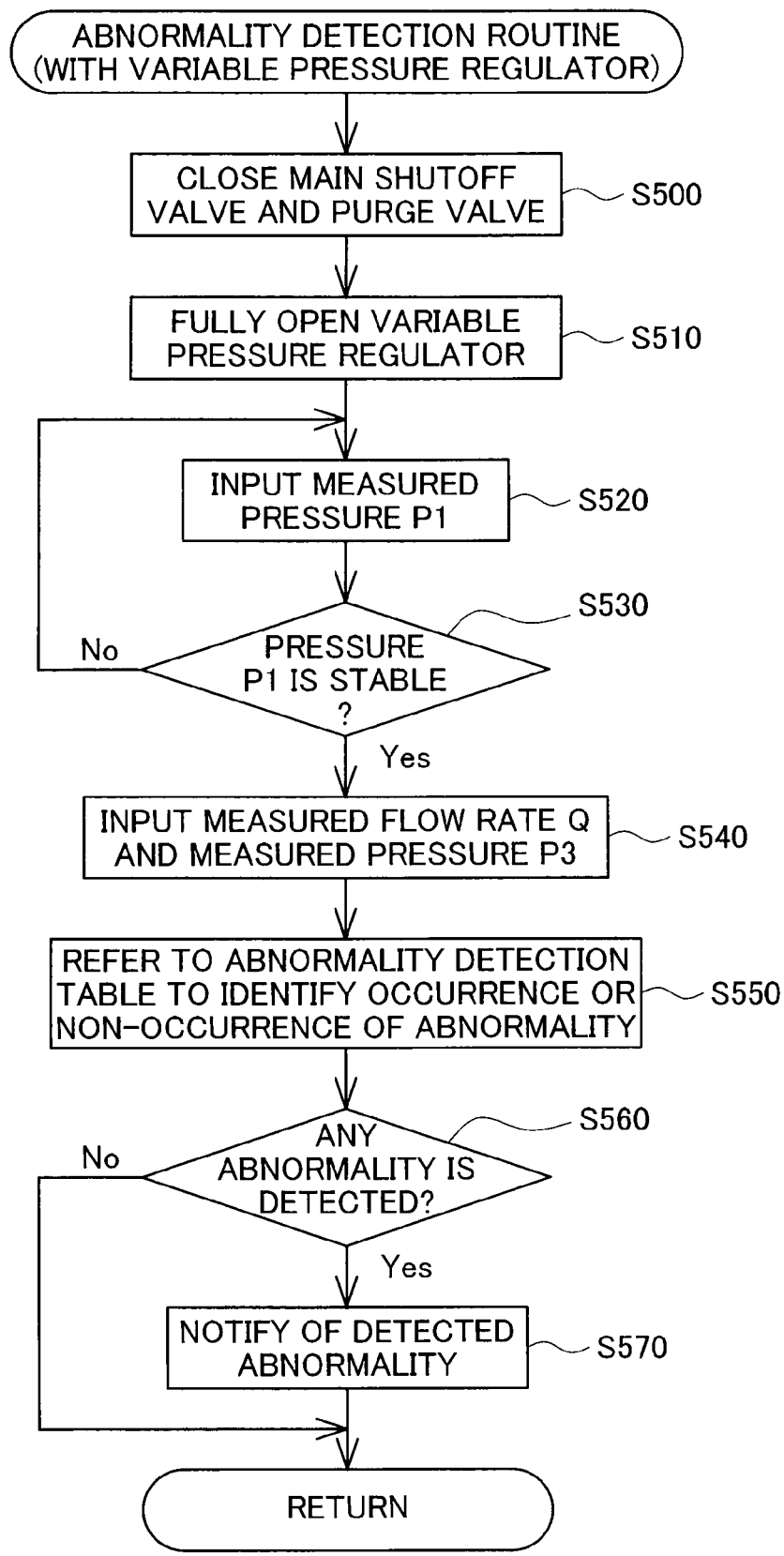
FIG. 6 is a flowchart showing an abnormality detection routine in a first modified example with a variable pressure regulator as a pressure regulator 210.

FIG. 6 is a flowchart showing an abnormality detection routine in the first modified example with the variable pressure regulator as the pressure regulator 210. This abnormality detection routine is performed in the system stop state. In the abnormality detection routine of FIG. 6, the control computer 400 first closes the main shutoff valve 200 and the purge valve 240 (step S500) to shut off the flow path connected to the anodes of the fuel cells 10. The control computer 400 subsequently forces the variable pressure regulator to be fully opened (step S510).

The control computer 400 inputs the pressure P1 measured in the low pressure section LS from the pressure sensor 310 (step S520) and determines whether the pressure P1 is stable (step S530). It is determined that the pressure P1 is stable when the measurement result of the pressure P1 is within a preset range over a preset time period. Upon identification of the unstable pressure P1 (step S530: no), the abnormality detection routine goes back to step S520 and waits until stabilization of the pressure P1. One modified procedure of steps S520 and S530 may compare the measured pressure P1 in the low pressure section LS with the measured pressure P3 in the high pressure section HS and determine that the pressure P1 is stable when the measured pressure P1 is equal to the measured pressure P3.

Upon identification of the stable pressure P1 (step S530: yes), it is determined that the high pressure section HS and the low pressure section LS of the hydrogen supply flow path 24 have an identical pressure level and that the fuel cell system 100 is made in the leakage detectable state. The control computer 400 then inputs the measured flow rate Q of hydrogen gas from the hydrogen flowmeter 300 and the pressure P3 measured in the high pressure section HS of the hydrogen supply flow path 24 by the pressure sensor 330 (step S540). The control computer 400 refers to the abnormality detection table shown in FIG. 3 and identifies the occurrence or non-occurrence of abnormality (step S550). Upon detection of any abnormality (step S560: yes), the control computer 400 notifies the driver of detection of an abnormality (step S570) and terminates the abnormality detection routine of the first modified example.

As described above, the variable pressure regulator adopted as the pressure regulator 210 is forced to be fully opened without reduction of the pressure in the low pressure section LS by the hydrogen consumption process. This arrangement enables easy detection of a hydrogen leakage and desirably saves the consumption of hydrogen.

SECOND MODIFIED EXAMPLE

Figure 7:
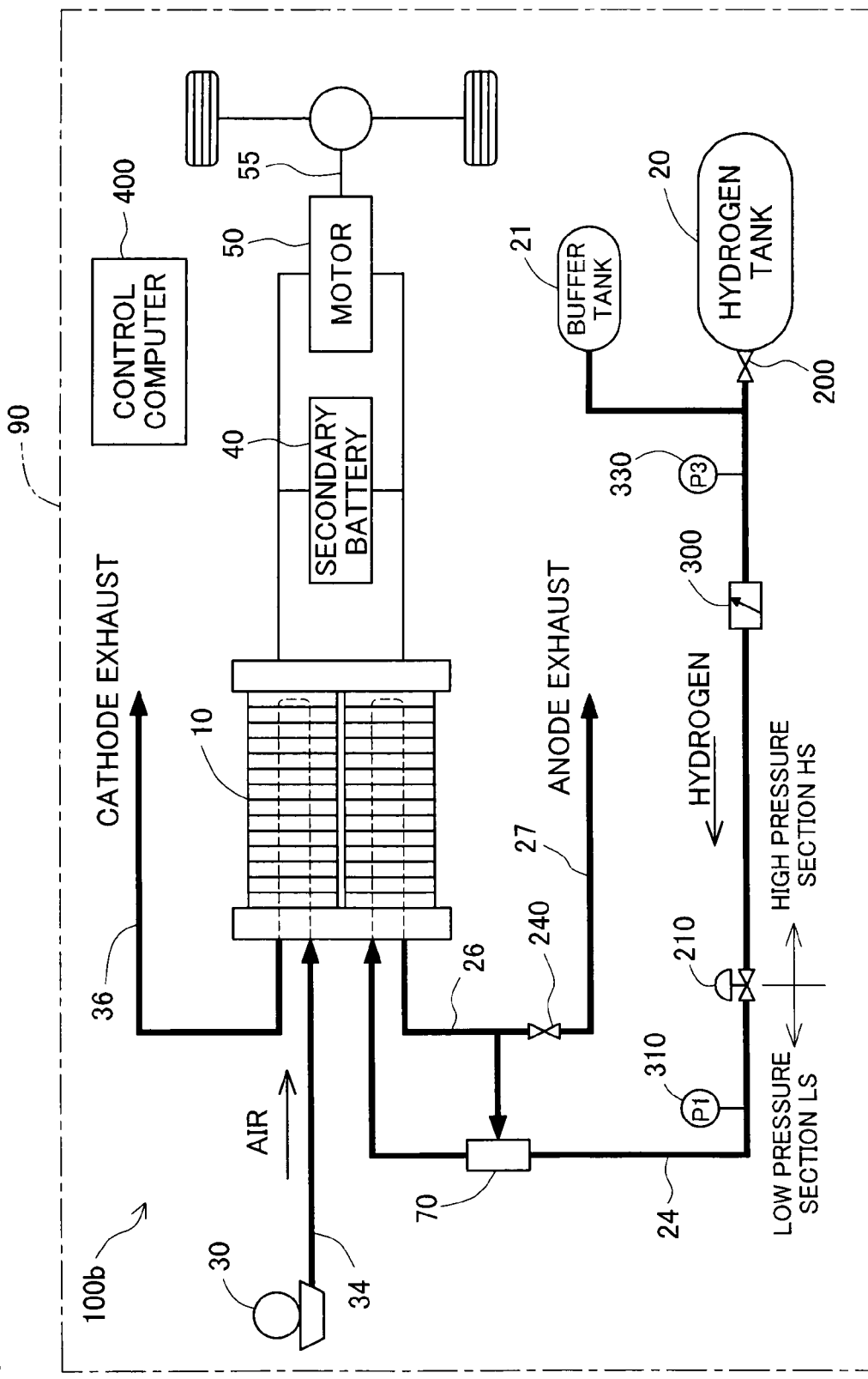
FIG. 7 schematically illustrates the general configuration of a fuel cell system 100b in a second modified example.

FIG. 7 schematically illustrates the general configuration of a fuel cell system 100b in a second modified example. The fuel cell system 100b of the second modified example shown in FIG. 7 has a similar structure to that of the fuel cell system 100 of the first embodiment shown in FIG. 1 but additionally includes a buffer tank 21 located between the main shutoff valve 200 and the hydrogen flowmeter 300 in the hydrogen supply flow path 24. The buffer tank 21 temporarily stores hydrogen gas supplied from the hydrogen tank 20 into the hydrogen supply flow path 24.

In the course of abnormality detection in the closed state of the main shutoff valve 200 and the purge valve 240, the hydrogen gas temporarily stored in the buffer tank 21 is supplied to the hydrogen supply flow path 24 connected with the buffer tank 21. This arrangement extends the time usable for detection of a hydrogen leakage and thus desirably enhances the accuracy of leakage detection.

THIRD MODIFIED EXAMPLE

Figure 8:
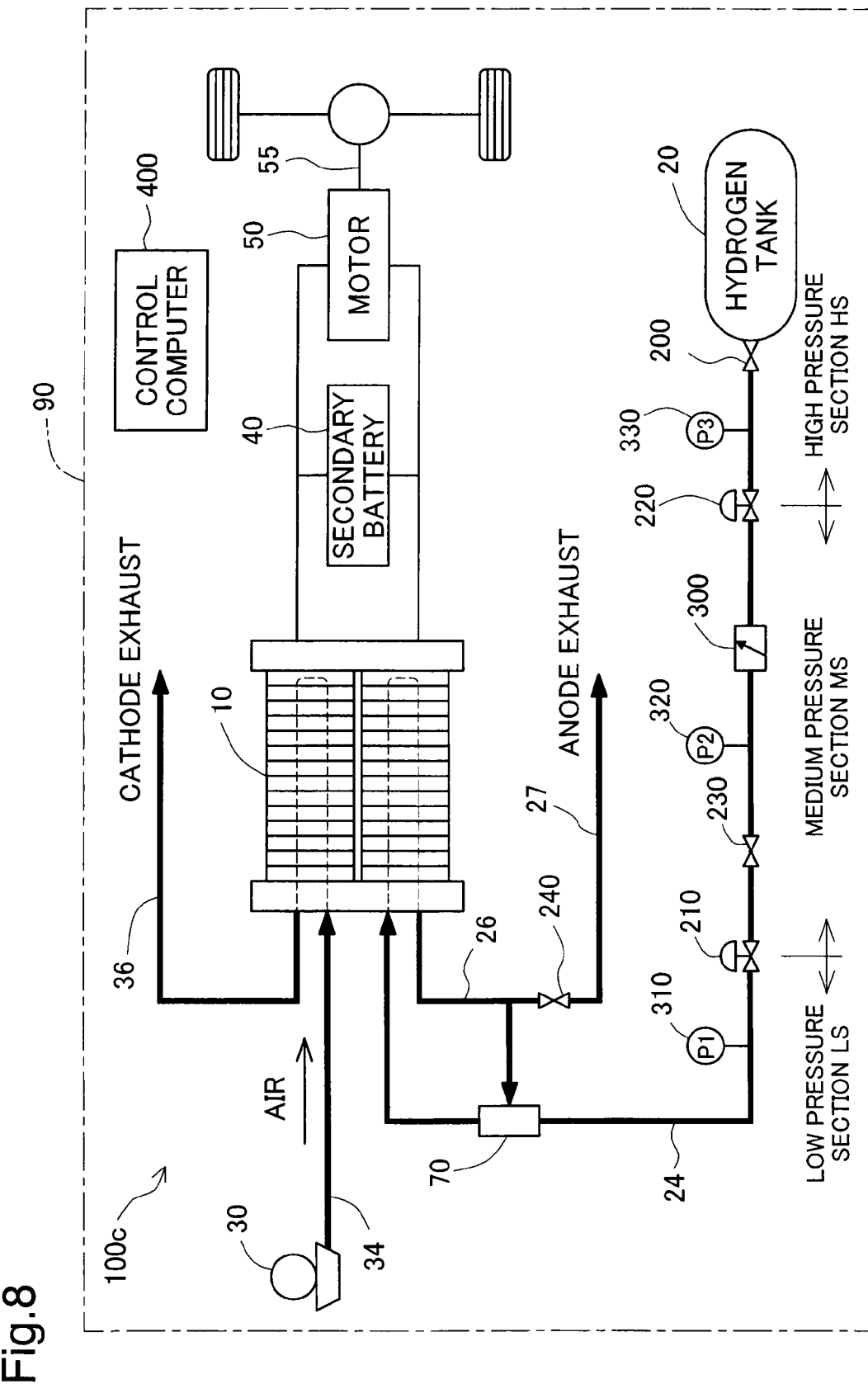
FIG. 8 schematically illustrates the general configuration of a fuel cell system 100c in a third modified example.

FIG. 8 schematically illustrates the general configuration of a fuel cell system 100c in a third modified example. The fuel cell system 100 of the first embodiment is designed to efficiently detect a hydrogen leakage occurring in the downstream of the pressure regulator 210 by using the hydrogen flowmeter 300 provided in the upstream of the pressure regulator 210. The fuel cell system 100c of the third modified example is designed to efficiently detect a leakage of main shutoff valve.

The fuel cell system 100c of this modified example adds a second pressure regulator 220 and an auxiliary shutoff valve 230 to the hydrogen supply flow path 24 in the fuel cell system 100 of the first embodiment shown in FIG. 1. The second pressure regulator 220 is located between the hydrogen flowmeter 300 and the main shutoff valve 200. The auxiliary shutoff valve 230 is located between the pressure regulator 210 and the hydrogen flowmeter 300. In the following description, the pressure regulator 210 of the first embodiment is called the first pressure regulator 210 for the purpose of differentiation. The auxiliary shutoff valve 230 is equivalent to the second shutoff valve of the invention.

In the structure of this modified example, the hydrogen supply flow path 24 has the two pressure regulators, that is, the first pressure regulator 210 and the second pressure regulator 220, and reduces the pressure of hydrogen gas supplied from the hydrogen tank 20 in a stepwise manner. Divisions of different pressure levels in the hydrogen supply flow path 24 made by the functions of these two pressure regulators are represented as a high pressure section HS, a medium pressure section MS, and a low pressure section LS as shown in FIG. 8. In the fuel cell system 100c of this modified example, a pressure sensor 320 is provided between the hydrogen flowmeter 300 and the auxiliary shutoff valve 230 to measure a pressure P2 in the medium pressure section MS. The pressure sensor 320 provided in the medium pressure section MS is not required to have such a high pressure resistance as the pressure sensor 330 provided in the high pressure section HS. A pressure sensor having higher measurement accuracy than that of the pressure sensor 330 in the high pressure section HS is thus applicable to the pressure sensor 320 in the medium pressure section MS.

Figure 9:
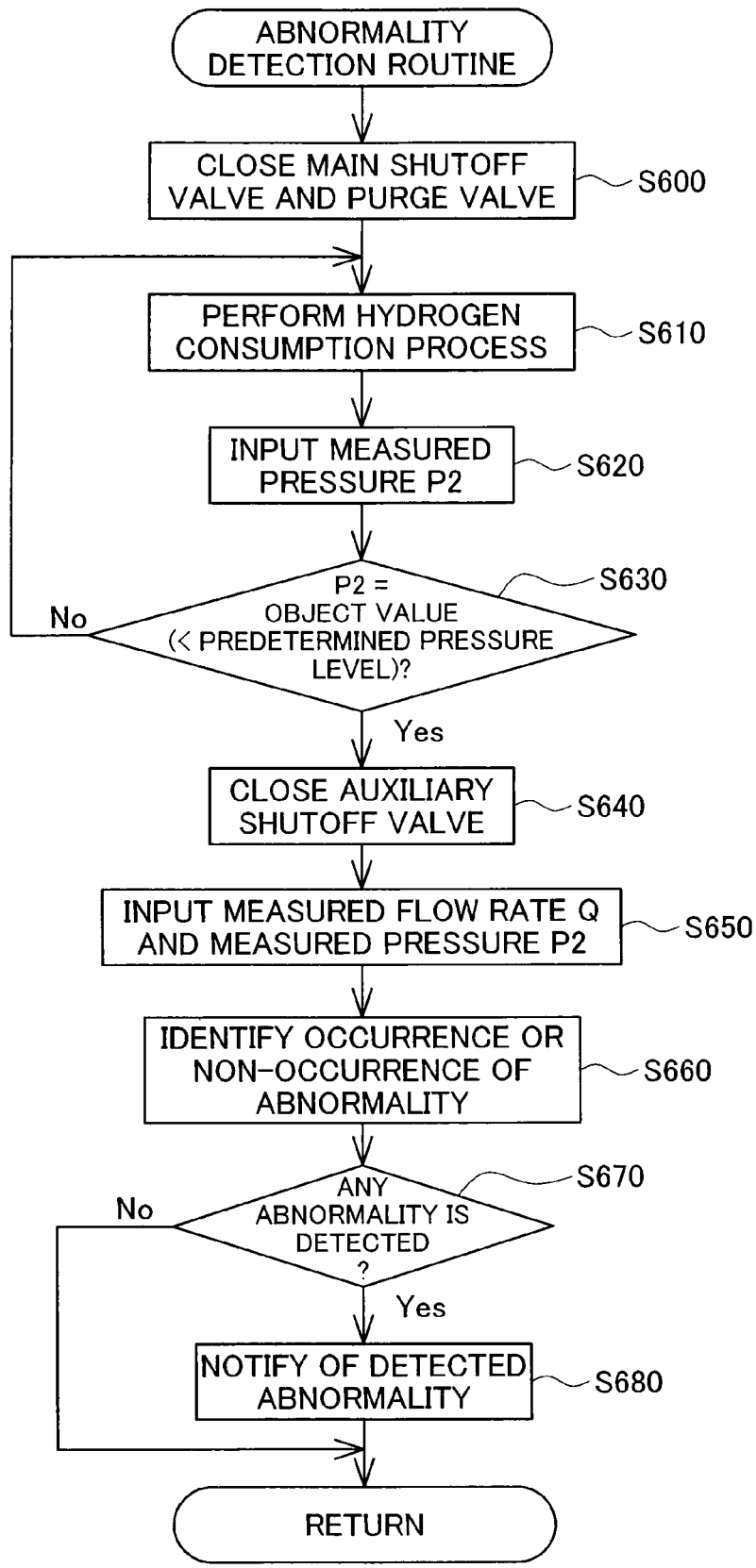
FIG. 9 is a flowchart showing an abnormality detection routine executed in the third modified example for detection of a leakage of main shutoff valve.

FIG. 9 is a flowchart showing an abnormality detection routine executed in the third modified example for detection of a leakage of main shutoff valve. This abnormality detection routine is performed in the system stop state. The auxiliary shutoff valve 230 is open in the initial state.

In the abnormality detection routine of FIG. 9, the control computer 400 first closes the main shutoff valve 200 and the purge valve 240 (step S600) to shut off the flow path connected to the anodes of the fuel cells 10 and performs the hydrogen consumption process (step S610). The control computer 400 inputs the pressure P2 measured in the medium pressure section MS by the pressure sensor 320 (step S620) and determines whether the measured pressure P2 has been reduced to a preset object value (step S630). When the measured pressure P2 has not yet been reduced to the preset object value (step S630: no), the abnormality detection routine goes back to step S610 to continue the hydrogen consumption process. The object value of the pressure P2 is determined to fully open the second pressure regulator 220.

When the measured pressure P2 has been reduced to the preset object value (step S630: yes), it is determined that both the second pressure regulator 220 and the first pressure regulator 210 are fully opened. Namely all the low pressure section LS, the medium pressure section MS, and the high pressure section HS of the hydrogen supply flow path 24 have an identical pressure level. The control computer 400 then closes the auxiliary shutoff valve 230 (step S640) to shut off a division of the hydrogen supply flow path 24 defined by the main shutoff valve 200 and the auxiliary shutoff valve 230.

In the shut-off state of the division of the hydrogen supply flow path 24 between the main shutoff valve 200 and the auxiliary shutoff valve 230, the control computer 400 inputs the measured flow rate Q from the hydrogen flowmeter 300 and the measured pressure P2 from the pressure sensor 320 (step S650) and performs abnormality detection (step S660). The occurrence of a leakage of main shutoff valve is detected in response to an increase in measured pressure P2. The occurrence of a hydrogen leakage either in the auxiliary shutoff valve 230 or in the division of the hydrogen supply flow path 24 between the main shutoff valve 200 and the auxiliary shutoff valve 230 is detected in response to a decrease in measured pressure P2. In the latter case, the location of the hydrogen leakage is identified as the upstream of the hydrogen flowmeter 300 or as the downstream of the hydrogen flowmeter 300 according to the positive-negative sign of the flow rate Q measured by the hydrogen flowmeter 300. Upon detection of any abnormality (step S670: yes), the control computer 400 notifies the driver of detection of an abnormality (step S680) and terminates the abnormality detection routine.

As described above, the structure of the third modified example uses the pressure sensor 320 that is provided in the medium pressure section MS and has the higher measurement accuracy than that of the pressure sensor 330 provided in the high pressure section HS. This arrangement enables accurate detection of a leakage of main shutoff valve.

At step S630 in the abnormality detection routine of FIG. 9, it is determined that the two pressure regulators 210 and 220 are fully opened when the pressure P2 in the medium pressure section MS after the hydrogen consumption process has been reduced to the preset object value. Another possible modification may compare the measured pressure P2 in the medium pressure section MS with the measured pressure P3 in the high pressure section HS and determine that the two pressure regulators 210 and 220 are fully opened when the measured pressure P2 is equal to the measured pressure P3.

B. Second Embodiment (B1) General Configuration of Fuel Cell System

The abnormal detection procedures of the first embodiment and its modified examples detect a hydrogen leakage without taking into account the potential cross leaking of hydrogen through the electrolyte membranes in the fuel cells 10. The abnormal detection procedure in a second embodiment of the invention, on the other hand, detects a hydrogen leakage with taking into account a transmission quantity of hydrogen by cross leaking as described later.

Figure 10:
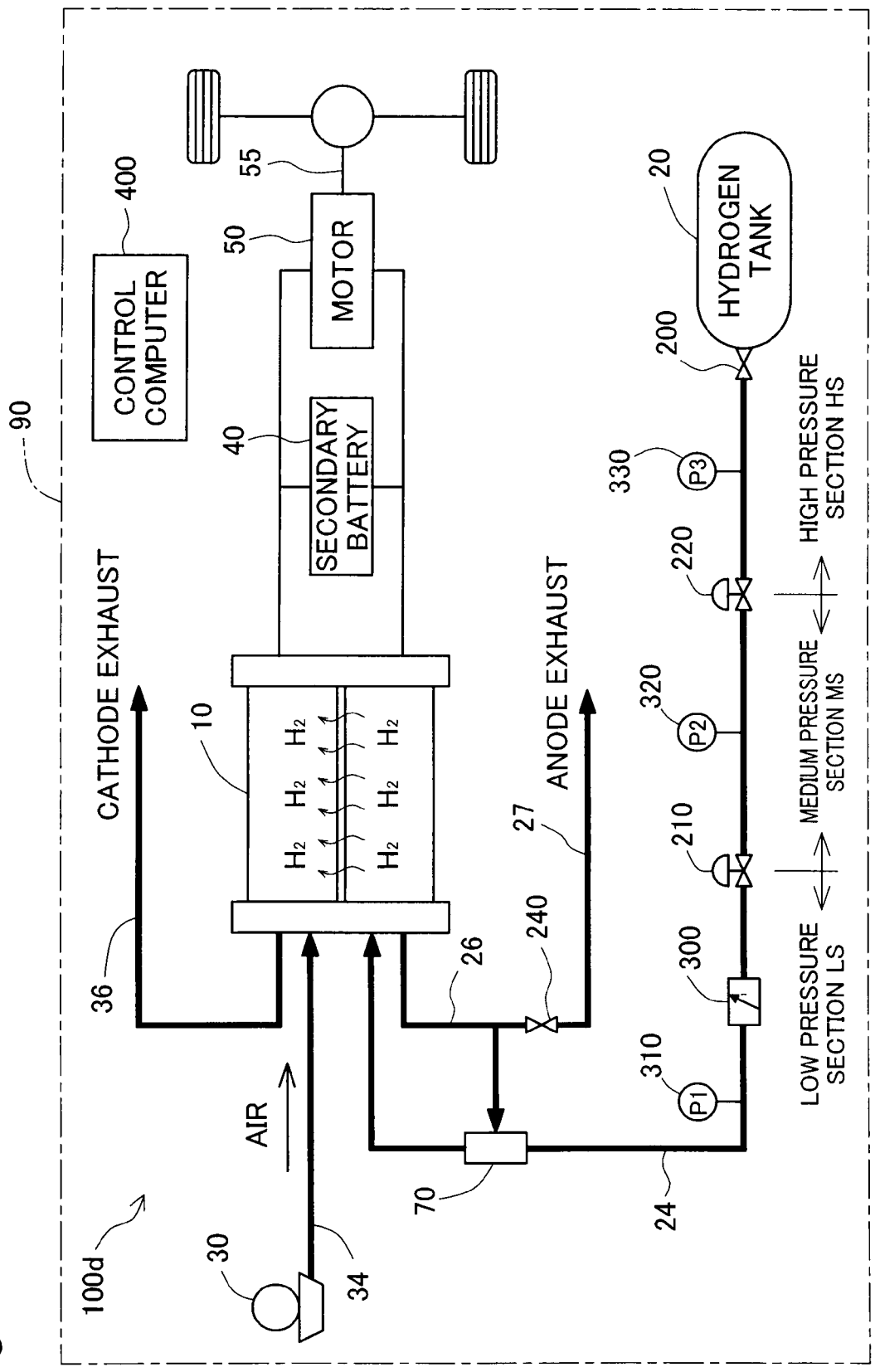
FIG. 10 schematically illustrates the general configuration of a fuel cell system 100d in a second embodiment of the invention.

FIG. 10 schematically illustrates the general configuration of a fuel cell system 100d in the second embodiment of the invention. The fuel cell system 100d of the second embodiment adds the second pressure regulator 220 and the pressure sensor 320 to the fuel cell system 100 of the first embodiment shown in FIG. 1. Namely the fuel cell system 100d of the second embodiment has a similar configuration to that of the fuel cell system 100c of the third modified example shown in FIG. 8 with some differences. The fuel cell system 100d of the second embodiment does not have the auxiliary shutoff valve 230 and locates the hydrogen flowmeter 300 in the downstream of the first pressure regulator 210. The fuel cell system 100d of the second embodiment has the two pressure regulators 210 and 220. Like the third modified example shown in FIG. 8, the divisions of different pressure levels in the hydrogen supply flow path 24 made by the functions of the two pressure regulators 210 and 220 are represented as the a high pressure section HS, the medium pressure section MS, and the low pressure section LS.

Figure 11:
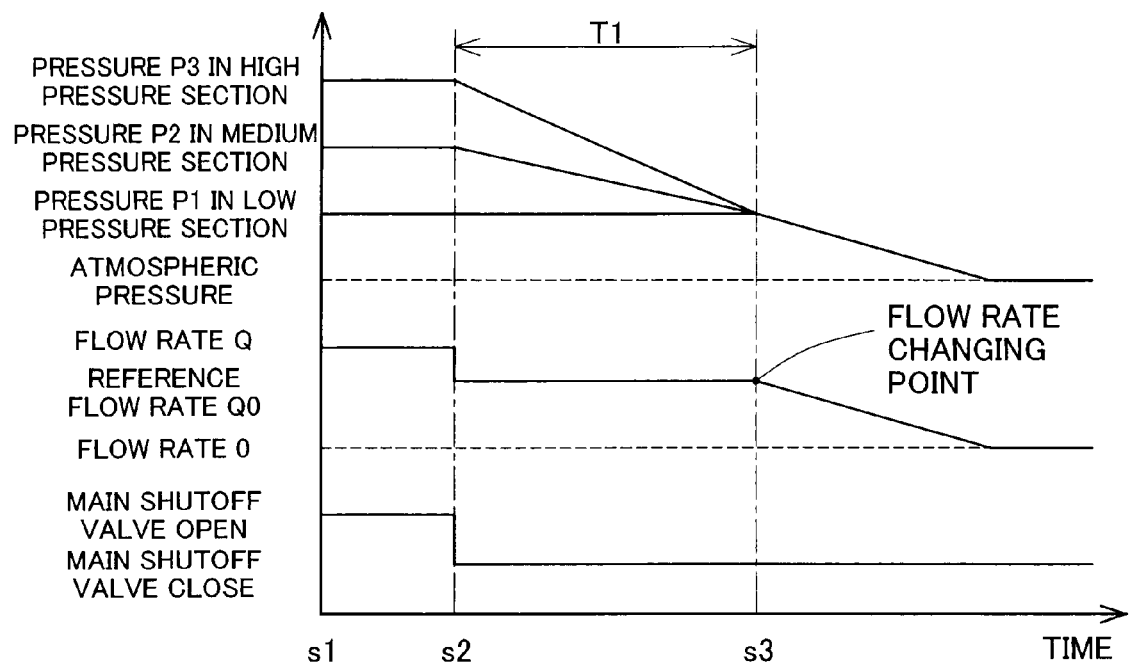
FIG. 11 shows variations of various state quantities in a normal state without any hydrogen leakage in the fuel cell system 100d of the second embodiment.

FIG. 11 shows variations of various state quantities in a normal state without any hydrogen leakage in the fuel cell system 100d of the second embodiment. As shown in this time chart, at a timing s1, the main shutoff valve 200 is open to supply the flow of hydrogen gas from the hydrogen tank 20 to the fuel cells 10. In this state, the pressure P3 in the high pressure section HS, the pressure P2 in the medium pressure section MS, and the pressure P1 in the low pressure section LS are respectively equal to an output pressure of hydrogen gas from the hydrogen tank 20, a predetermined pressure level set in the second pressure regulator 220, and a predetermined pressure level set in the first pressure regulator 210. The low pressure section LS with the hydrogen flowmeter 300 has a hydrogen flow of a preset flow rate Q.

At a timing s2, the main shutoff valve 200 and the purge valve 240 are closed. The hydrogen flow rate in this state is equal to a reference flow rate Q0 (<Q) of hydrogen that is transmitted from the anodes to the cathodes by cross leaking. Transmission of hydrogen to the cathodes by cross leaking decreases the pressure P1 in the low pressure section LS. In response to the decrease of the pressure P1 in the low pressure section LS, the first pressure regulator 210 is opened to supply the flow of hydrogen gas from the medium pressure section MS to the low pressure section LS. The pressure P1 in the low pressure section LS is thus kept constant as long as the pressure P2 in the medium pressure section MS is higher than the pressure P1 in the low pressure section LS. The hydrogen flow from the medium pressure section MS to the low pressure section LS decreases the pressure P2 in the medium pressure section MS. In response to the decrease of the pressure P2 in the medium pressure section MS, the second pressure regulator 220 is opened to supply the flow of hydrogen gas from the high pressure section HS to the medium pressure section MS. The supply of hydrogen flows from the high pressure section HS and the medium pressure section MS to the low pressure section LS with elapse of time. The pressure P1 in the low pressure section LS is thus kept constant until a certain timing s3.

At the timing s3, the pressure P2 in the medium pressure section MS and the pressure P3 in the high pressure section HS are made equal to the pressure P1 in the low pressure section LS. The first pressure regulator 210 and the second pressure regulator 220 are fully opened to be kept in the state without pressure regulation. In this state, with transmission of hydrogen to the cathodes by cross leaking, the pressures P1, P2, and P3 in the respective pressure sections LS, MS, and HS are simultaneously lowered gradually to the atmospheric level. The reference flow rate Q0 of hydrogen transmitted by cross leaking decreases to zero with this pressure decrease. In the description below, a flow rate changing point represents a start timing of decreasing the hydrogen flow rate when the two pressure regulators 210 and 220 are fully opened to keep the hydrogen supply flow path 24 in the state with no pressure regulation and equalize the pressures P1, P2, and P3 in the respective pressure sections LS, MS, and HS after closure of the main shutoff valve 200 and the purge valve 240. A reference time T1 represents a time period elapsed until the flow rate changing point since closure of the main shutoff valve 200 and the purge valve 240.

The reference time T1 is expressed by Equation (1) or Equation (1b) given below:

$$T1=(P2V2+P3V3)/Q0-(P0V2+P0V3)/Q0 \quad (1)$$

$$T1=\Sigma PnVn/Q0 \quad (1b)$$

(n=1, 2, 3)

In these equations, V0 and P0 respectively denote a volume of the low pressure section LS in the downstream of the hydrogen flowmeter 300 and a pressure in the low pressure section LS in the downstream of the hydrogen flowmeter 300 prior to the pressure reduction. V1 and P1(=P0) respectively denote a volume of the low pressure section LS in the upstream of the hydrogen flowmeter 300 and a pressure in the low pressure section LS in the upstream of the hydrogen flowmeter 300 prior to the pressure reduction. V2 and P2 respectively denotes a volume of the medium pressure section MS and a pressure in the medium pressure section MS prior to the pressure reduction. V3 and P3 respectively denote a volume of the high pressure section HS and a pressure in the high pressure section HS prior to the pressure reduction. Q0 represents the reference flow rate of hydrogen transmitted by cross leaking in the reference time T1.

Figure 12:
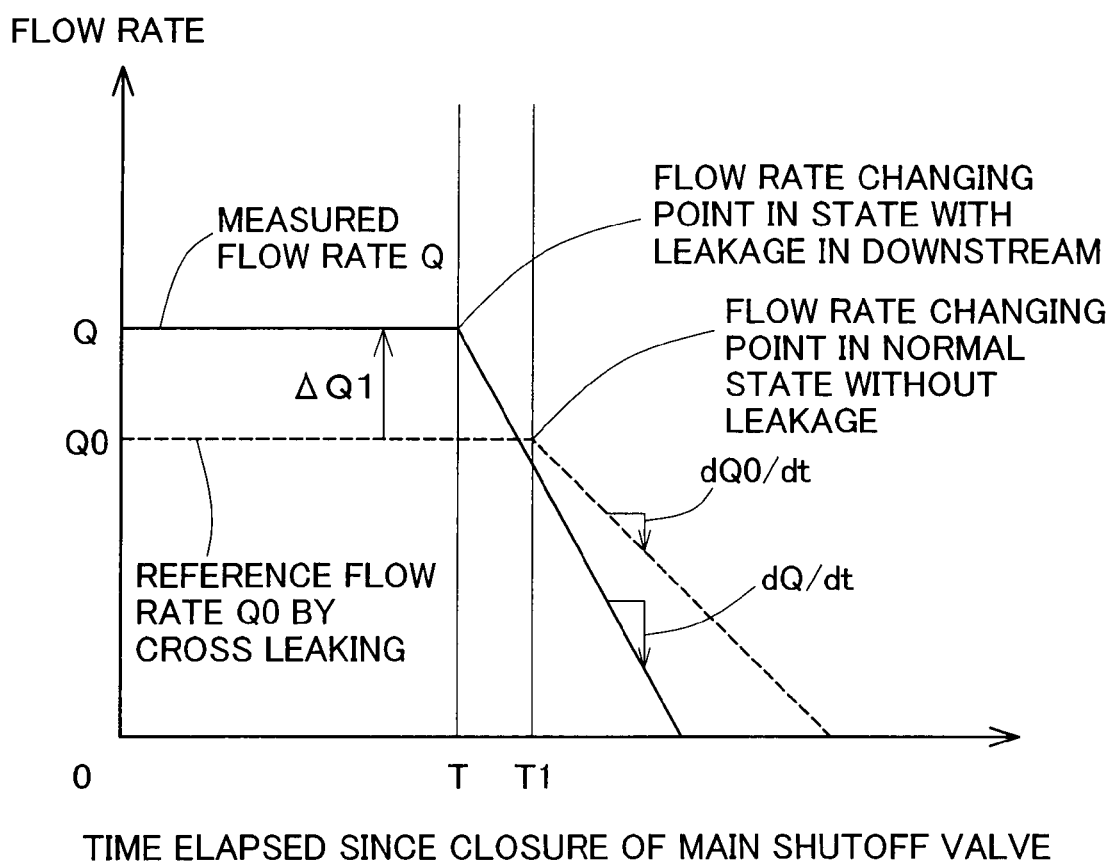
FIG. 12 shows a variation in flow rate of hydrogen in the event of a hydrogen leakage in the downstream of a hydrogen flowmeter 300.

FIG. 12 shows a variation in flow rate of hydrogen in the event of a hydrogen leakage in the downstream of the hydrogen flowmeter 300. A solid-line plot represents a variation of the hydrogen flow rate in the state with a hydrogen leakage in the downstream. A broken-line plot represents a variation of the hydrogen flow rate in the normal state without any hydrogen leakage.

In the event of a hydrogen leakage in the downstream of the hydrogen flowmeter 300, the flow rate Q of hydrogen measured by the hydrogen flowmeter 300 is increased by a magnitude $\Delta Q1$ from the reference flow rate Q0 of hydrogen transmitted by cross leaking. The increased flow rate Q causes the faster hydrogen outflow from the hydrogen supply flow path 24. A time T elapsed until the flow rate changing point in this state with the downstream hydrogen leakage is shorter than the reference time T1 in the normal state without any hydrogen leakage. Because of the faster hydrogen outflow in the state with the downstream hydrogen leakage than that in the normal state with no hydrogen leakage, the slope of the decreasing flow rate Q after the flow rate changing point in the state with the downstream hydrogen leakage is steeper than the slope of the decreasing flow rate Q in the normal state with no hydrogen leakage.

Figure 13:
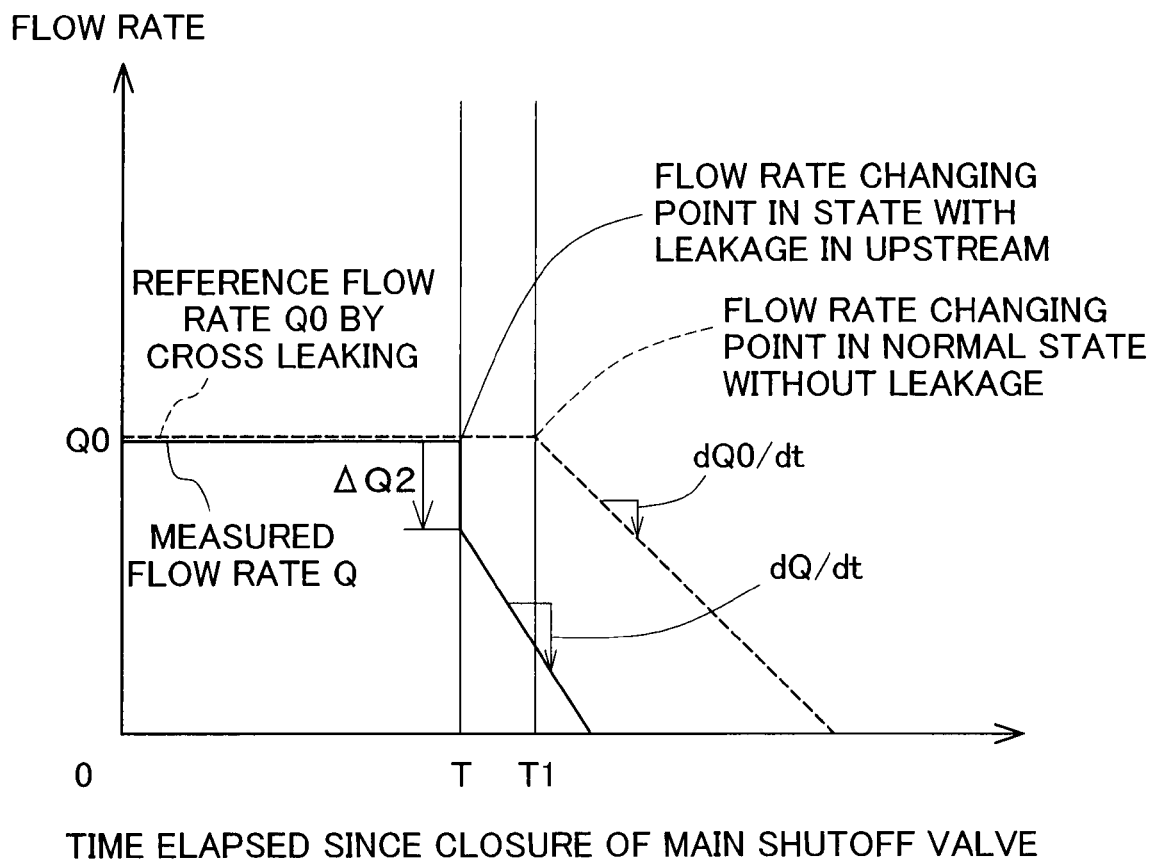
FIG. 13 shows a variation in flow rate of hydrogen in the event of a hydrogen leakage in the upstream of the hydrogen flowmeter 300.

FIG. 13 shows a variation in flow rate of hydrogen in the event of a hydrogen leakage in the upstream of the hydrogen flowmeter 300. A solid-line plot represents a variation of the hydrogen flow rate in the state with a hydrogen leakage in the upstream. A broken-line plot represents a variation of the hydrogen flow rate in the normal state without any hydrogen leakage.

In the event of a hydrogen leakage in the upstream of the hydrogen flowmeter 300, the flow rate Q of hydrogen measured by the hydrogen flowmeter 300 is equal to the reference flow rate Q0 of hydrogen transmitted by cross leaking until the flow rate changing point. The hydrogen leakage in the upstream causes the faster hydrogen outflow from the hydrogen supply flow path 24. The time T elapsed until the flow rate changing point in this state with the upstream hydrogen leakage is accordingly shorter than the reference time T1 in the normal state without any hydrogen leakage. After the flow rate changing point, a hydrogen flow in the opposite direction due to the hydrogen leakage in the upstream abruptly decreases the flow rate Q measured by the hydrogen flowmeter 300 by a magnitude $\Delta Q2$. When the flow rate of hydrogen in the opposite direction due to the upstream hydrogen leakage is higher than the reference flow rate Q0 of hydrogen transmitted by cross leaking, the flow rate Q measured by the hydrogen flowmeter 300 has a negative value. Because of the faster hydrogen outflow in the state with the upstream hydrogen leakage than that in the normal state with no hydrogen leakage, the slope of the decreasing flow rate Q after the flow rate changing point in the state with the upstream hydrogen leakage is steeper than the slope of the decreasing flow rate Q in the normal state with no hydrogen leakage, like the graph of FIG. 12.

The following describes the detection procedures of a hydrogen leakage, based on the variation in hydrogen flow rate and the time elapsed until the flow rate changing point shown in the graph of FIG. 12 or FIG. 13.

(B2) Abnormality Detection Process in System Stop State

Figure 14:
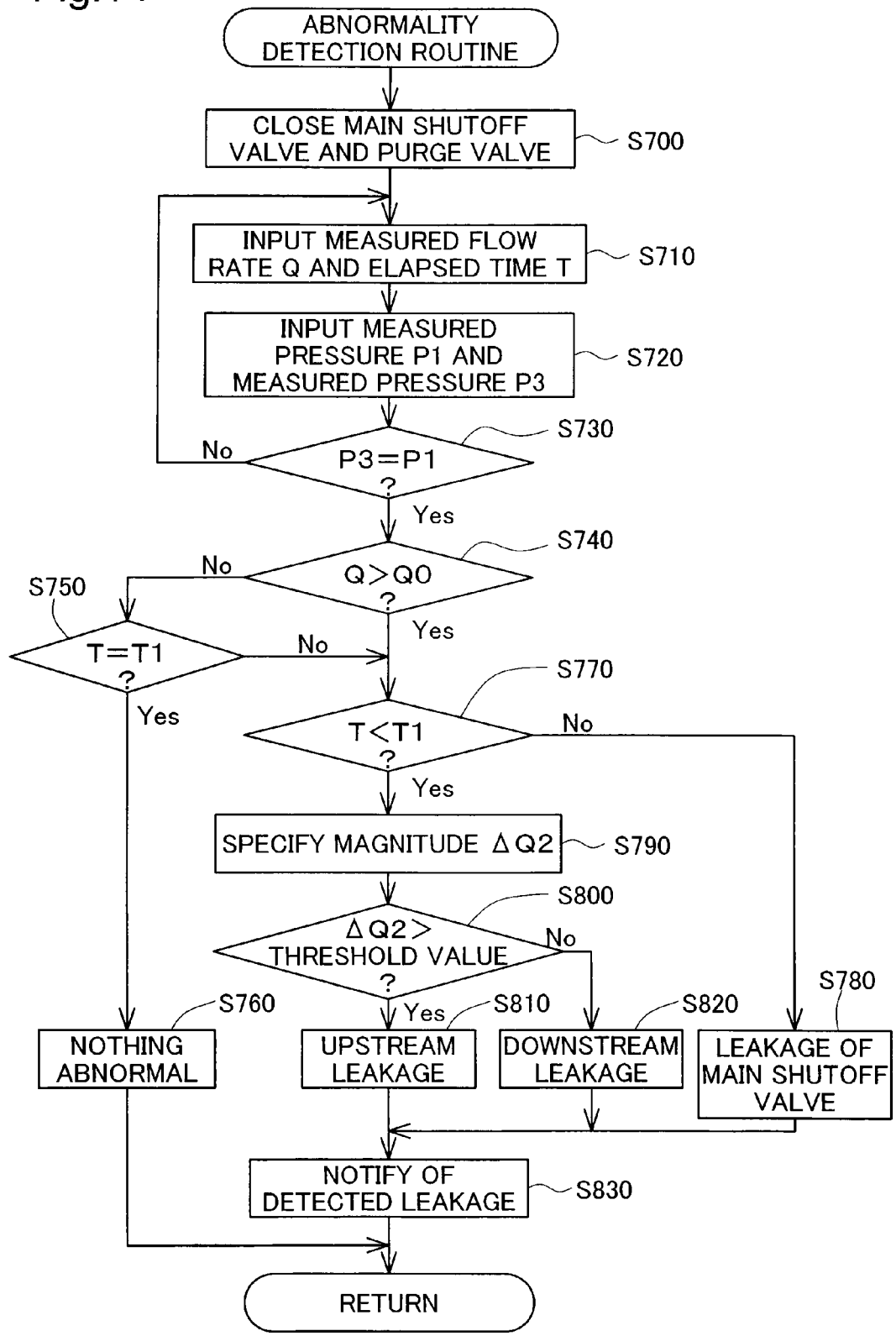
FIG. 14 is a flowchart showing an abnormality detection routine executed in the stop state of the fuel cell system 100d in the second embodiment.

FIG. 14 is a flowchart showing an abnormality detection routine executed in the stop state of the fuel cell system 100d in the second embodiment. In the same manner as the abnormality detection routine of the first embodiment, the abnormality detection routine of the second embodiment is executed by the control computer 400, for example, in response to the driver's OFF operation of the ignition switch to completely stop the vehicle 90 or in the state of intermittent operation where power generation by the fuel cells 10 is stopped and the vehicle 90 is driven with only the electric power accumulated in the secondary battery 40.

In the abnormality detection routine of FIG. 14, the control computer 400 first closes the main shutoff valve 200 and the purge valve 240 (step S700) and inputs the flow rate Q of hydrogen measured by the hydrogen flowmeter 300 and the time T elapsed since closure of the main shutoff valve 200 and the purge valve 240 and measured by, for example, a built-in timer of the control computer 400 (step S710). The control computer 400 inputs the measured pressure P1 in the low pressure section LS from the pressure sensor 310 and the measured pressure P3 in the high pressure section HS from the pressure sensor 330 (step S720) and determines whether the measured pressure P1 is equal to the measured pressure P3 (step S730). When the measured pressure P1 is equal to the measured pressure P3 (step S730: yes), it is determined that the first pressure regulator 210 and the second pressure regulator 220 are fully opened and that the flow rate changing point comes to make the fuel cell system 100d in the leakage detectable state. The control computer 400 accordingly proceeds to subsequent step S740. When the measured pressure P1 is not equal to the measured pressure P3 (step S730: no), on the other hand, the abnormality detection routine goes back to step S710 and repeats the above series of processing until the flow rate changing point comes.

When the measured pressure P1 is equal to the measured pressure P3 (step S730) and it is determined that the flow rate changing point comes, the control computer 400 determines whether the measured flow rate Q input at step S710 is higher than the reference flow rate Q0 in the state without any leakage (step S740). The reference flow rate Q0 may be experimentally or otherwise determined and stored in advance in the ROM. When the measured flow rate Q is higher than the reference flow rate Q0 (step S740: yes) as shown in FIG. 12, the control computer 400 expects the occurrence of a hydrogen leakage irrespective of the elapsed time T and goes to step S770. When the measured flow rate Q is not higher than the reference flow rate Q0 (step S740: no), on the other hand, it is determined whether the elapsed time T is equal to the reference time T1 in the state with no leakage (step S750). When the elapsed time T is equal to the reference time T1 (step S750: yes), the control computer 400 specifies 'nothing abnormal' (step S760) and terminates the abnormality detection routine. When the elapsed time T is not equal to the reference time T1 regardless of the measured flow rate Q equal to the reference flow rate Q0 (step S750: no) as shown in FIG. 13, the control computer 400 expects the occurrence of a hydrogen leakage and goes to step S770. The reference time T1 may be determined according to Equation (1) or Equation (1b) given above and stored in advance in the ROM.

When the measured flow rate Q is higher than the reference flow rate Q0 (step S740: yes) or when the elapsed time T is not equal to the reference time T1 (step S750: no), the control computer 400 further determines whether the elapsed time T is shorter than the reference time T1 in the state with no leakage (step S770). When the elapsed time T is not shorter than the reference time T1 (step S770: no), the control computer 400 specifies the occurrence of a leakage of main shutoff valve (step S780). When the elapsed time T is shorter than the reference time T1 in the state with no leakage (step S770: yes), on the other hand, it is expected that there is a hydrogen leakage somewhere in the hydrogen supply flow path 24. In order to identify the location of the hydrogen leakage either in the upstream of the hydrogen flowmeter 300 or in the downstream of the hydrogen flowmeter 300, the control computer 400 inputs the flow rate Q measured again by the hydrogen flowmeter 300 and specifies the magnitude $\Delta Q2$ of an abrupt change in flow rate at the flow rate changing point (see FIG. 13) (step S790). When the magnitude $\Delta Q2$ is greater than a preset threshold value (step S800: yes), the control computer 400 specifies the occurrence of a hydrogen leakage in the upstream of the hydrogen flowmeter 300 (step S810). When the magnitude $\Delta Q2$ is not greater than the preset threshold value (step S800: no), on the other hand, the control computer 400 specifies the occurrence of a hydrogen leakage in the downstream of the hydrogen flowmeter 300 (step S820). The threshold value used for identifying the location of a hydrogen leakage at step S800 is theoretically equal to zero but may be set greater than zero for the purpose of elimination of a potential measurement error.

In response to detection of a leakage of main shutoff valve at step S780, detection of an upstream leakage at step S810, or detection of a downstream leakage at step S820, the control computer 400 notifies the driver of detection of the leakage (step S830) and terminates the abnormality detection routine.

As described above, the abnormality detection routine of the second embodiment performs the abnormality detection with taking into account the transmission quantity of hydrogen by cross leaking. This arrangement enables highly accurate detection of a hydrogen leakage. The abnormality detection is based on the behaviors of the flow rate Q and the time T elapsed until the flow rate changing point. The abnormality detection routine of the second embodiment can thus readily identify the location of a hydrogen leakage.

An upstream leakage quantity Q1 may be calculated from the magnitude $\Delta Q2$ specified at step S790. The concrete procedure of calculation subtracts the reference flow rate Q0 of hydrogen transmitted by cross leaking in the state of fully opening the respective pressure regulators 210 and 220 from the previous reference flow rate Q0 of hydrogen transmitted by cross leaking $\Delta Q2$ in the previous state before fully opening the respective pressure regulators 210 and 220. The calculation procedure then adds a flow rate of a reverse flow (in the opposite direction) based on the upstream leakage quantity Q1 in the state of fully opening the respective pressure regulators 210 and 220 to the result of the subtraction to give the magnitude $\Delta Q2$. This calculation is expressed by Equation (2) given blow:

$$\Delta Q2 = Q0 - Q0(V1+V2+V3)/V + Q1V0/V \qquad (2)$$

where $V=V0+V1+V2+V3$.
Equation (2) may be rewritten as:

$$\Delta Q2 = Q0 - Q0(V-V0)/V + Q1V0/V \qquad (2b)$$

The control computer 400 substitutes specified values $\Delta Q2$, Q0, and V0 through V3 to the respective parameters in Equation (2) or Equation (2b) to calculate the upstream leakage quantity Q1 of hydrogen in the upstream of the hydrogen flowmeter 300. The location of a hydrogen leakage may be identified according to the upstream leakage quantity Q1 calculated in this manner, instead of the magnitude $\Delta Q2$ at step S800.

(B3) Another Flow of Abnormality Detection Process in System Stop State

Figure 15:
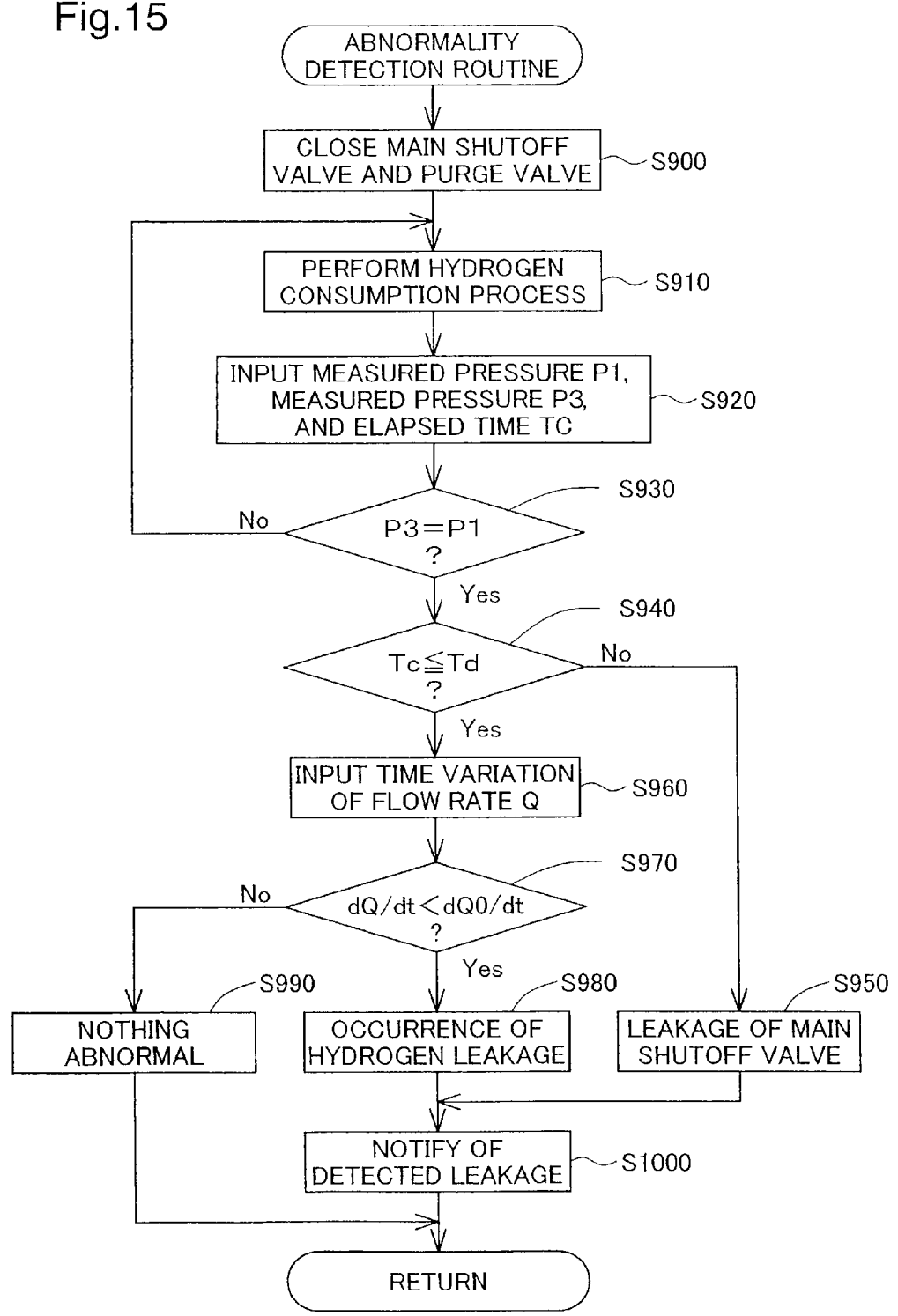
FIG. 15 is a flowchart showing another abnormality detection routine executed in the stop state of the fuel cell system 100d.

FIG. 15 is a flowchart showing another abnormality detection routine executed in the stop state of the fuel cell system 100d. The abnormality detection routine of FIG. 15 additionally performs the hydrogen consumption process to shorten the time required for detection of a hydrogen leakage.

In the abnormality detection routine of FIG. 15, the control computer 400 first closes the main shutoff valve 200 and the purge valve 240 (step S900) and performs the hydrogen consumption process (step S910). The control computer 400 subsequently inputs the measured pressure P1 in the low pressure section P1, the measured pressure P3 in the high pressure section HS, and a time Tc elapsed since the closure of the main shutoff valve 200 and the purge valve 240 as a time required for the hydrogen consumption process (step S920) and determines whether the measured pressure P1 is equal to the measured pressure P3 (step S930). When the measured pressure P1 is not equal to the measured pressure P3 (step S930: no), it is determined that the flow rate changing point has not yet come with still insufficient consumption of hydrogen. The control computer 400 accordingly goes back step S910 and repeats the above series of processing until equalization of the two measured pressures P1 and P3.

When the measured pressure P1 is equal to the measured pressure P3 (step S930: yes), it is determined that the fuel cell system 100d is made in the leakage detectable state. The control computer 400 then determines whether the time Tc required for the hydrogen consumption process is not longer than a reference time Td generally required for the hydrogen consumption process in the normal state with no hydrogen leakage (step S940). When the elapsed time Tc is longer than the reference time Td (step S940: no), the control computer 400 specifies the occurrence of a leakage of main shutoff valve. The reference time Td may be experimentally or otherwise determined as the general time required for the hydrogen consumption process in the normal state with no hydrogen leakage and stored in advance in the ROM. One possible modification may use the outside temperature or other suitable parameters to determine the reference time Td according to a specific function or a specific map.

When the elapsed time Tc is not longer than the reference time Td (step S940: yes), on the other hand, it is required to identify the occurrence or non-occurrence of any hydrogen leakage somewhere other than the main shutoff valve 200. The control computer 400 then inputs a time variation dQ/dt of the flow rate Q per unit time from the hydrogen flowmeter 300 (step S960) and determines whether the time variation dQ/dt is less than a reference time variation dQ0/dt in the state with no hydrogen leakage (step S970). When the time variation dQ/dt is less than the reference time variation dQ0/dt (step S970: yes), the slope of the flow rate-time plot after the flow rate changing point in the current state is expected to be steeper than the slope of the flow rate-time plot in the normal state with no hydrogen leakage as shown in FIG. 12 or FIG. 13. The control computer 400 thus specifies the occurrence of a hydrogen leakage somewhere in the flow path between the main shutoff valve 200 and the purge valve 240 (step S980). When the time variation dQ/dt is not less than the reference time variation dQ0/dt (step S970: no), the control computer 400 specifies 'nothing abnormal' (step S990).

In response to detection of a leakage of main shutoff valve at step S950 or detection of the occurrence of a hydrogen leakage at step S980, the control computer 400 notifies the driver of detection of the leakage (step S1000) and terminates the abnormality detection routine.

As described above, this abnormality detection routine performs the hydrogen consumption process to shorten the time required for detection of a hydrogen leakage. The slope of the flow rate-time plot after the flow rate changing point is utilized to detect the occurrence or non-occurrence of a hydrogen leakage.

At step S970 in the abnormality detection routine, the control computer 400 may calculate the time variation dQ/dt of the flow rate Q according to Equation (3) given below and the reference time variation dQ0/dt of the flow rate Q0 in the state with no hydrogen leakage according to Equation (4) given below:

$$dQ/dT = -Q^2/(P1 \cdot V) \quad (3)$$

$$dQ0/dt = -Q0^2/(P1 \cdot V) \quad (4)$$

where P1 represents a pressure for fully opening the respective pressure regulators 210 and 220, and V=V0+V1+V2+V3.

As described above in detail with reference to some embodiments and possible modifications, in the presence of one or multiple pressure regulators in the hydrogen supply flow path 24, the abnormality detection process efficiently detects a hydrogen leakage over the whole flow path on the anode side between the main shutoff valve 200 and the purge valve 240 by using only one hydrogen flowmeter or one pressure sensor.

The embodiments and their modified examples discussed above are to be considered in all aspects as illustrative and not restrictive. There may be many modifications, changes, and alterations without departing from the scope or spirit of the main characteristics of the present invention. For example, in the above embodiments and the modified examples, the abnormality detection process detects the occurrence of a hydrogen leakage after the pressure regulator is fully opened. One modified procedure of abnormality detection may detect the occurrence of a hydrogen leakage even when the pressure regulator is not fully opened but is kept at a predetermined opening. This is because the pressures in the upstream and in the downstream of the pressure regulator are gradually equalized with elapse of time even when the pressure regulator is not fully opened.

The invention claimed is:

1. A fuel cell system having fuel cells,
the fuel cell system comprising:
a hydrogen supply unit that feeds a supply of hydrogen to the fuel cells;
a hydrogen supply flow path that connects the hydrogen supply unit to the fuel cells:
a shutoff valve located between the hydrogen supply unit and the hydrogen supply flow path, that shuts off the supply of hydrogen from the hydrogen supply unit into the hydrogen supply flow path;
a pressure regulator that is provided in the hydrogen supply flow path to reduce a pressure of hydrogen supplied from the hydrogen supply unit;
a state quantity measurement unit that measures at least one of a pressure and a flow rate as a state quantity of hydrogen in the hydrogen supply flow path in an upstream direction from the pressure regulator to the shutoff valve and also in the flow path in a downstream direction from the pressure regulator to the fuel cells;
a state control module programmed in a leak detection mode to close the shutoff valve and open the pressure regulator to keep the hydrogen supply flow path in a state with no pressure regulation and make the fuel cell in a leakage detectable state; and
a leakage detection module programmed to analyze in the leakage detectable state a behavior of the state quantity detected by the state quantity measurement unit and accordingly specify occurrence of a hydrogen leakage in the downstream of the hydrogen supply unit,
wherein the leakage detection module is programmed to measure a time elapsed until the pressure regulator is opened to make the hydrogen supply flow path in the state with no pressure regulation since the closure of the shutoff valve by the state control module, and
the leakage detection module includes at least either one of:
a module programmed to specify occurrence of a hydrogen leakage when the elapsed time is shorter than a reference time required for opening the pressure regulator and making the hydrogen supply flow path in the state with no pressure regulation in a normal state with no hydrogen leakage; and a module programmed to specify occurrence of a hydrogen leakage from the closed shutoff valve into the hydrogen supply flow path when the elapsed time is longer than the reference time.

2. The fuel cell system in accordance with claim 1, wherein the pressure regulator is a variable pressure regulator that directly adjusts an opening in response to an external control, and the state control module controls the pressure regulator to open the pressure regulator and make the pressure regulator in the state without pressure regulation.

3. The fuel cell system in accordance with claim 1, wherein the hydrogen supply flow path has a buffer tank that is located between the shutoff valve and the state quantity measurement unit to temporarily store the hydrogen supplied from the hydrogen supply unit.

4. A fuel cell system having fuel cells,
the fuel cell system comprising:
a hydrogen supply unit that feeds a supply of hydrogen to the fuel cells;
a hydrogen supply flow path that connects the hydrogen supply unit to the fuel cells:
a shutoff valve located between the hydrogen supply unit and the hydrogen supply flow path, that shuts off the supply of hydrogen from the hydrogen supply unit into the hydrogen supply flow path;
a pressure regulator that is provided in the hydrogen supply flow path to reduce a pressure of hydrogen supplied from the hydrogen supply unit;
a state quantity measurement unit that measures at least one of a pressure and a flow rate as a state quantity of hydrogen in the hydrogen supply flow path in an upstream direction from the pressure regulator to the shutoff valve and also in the flow path in a downstream direction from the pressure regulator to the fuel cells;
a state control module programmed in a leak detection mode to close the shutoff valve and open the pressure regulator to keep the hydrogen supply flow path in a state with no pressure regulation and make the fuel cell in a leakage detectable state; and
a leakage detection module programmed to analyze in the leakage detectable state a behavior of the state quantity detected by the state quantity measurement unit and accordingly specify occurrence of a hydrogen leakage in the downstream of the hydrogen supply unit,
wherein the state quantity measurement unit measures the flow rate as the state quantity of the hydrogen and the leakage detection module includes:
a module programmed to compute a time variation of the flow rate after the pressure regulator is opened to make the hydrogen flow path in the state with no pressure regulation and programmed to specify occurrence of a hydrogen leakage when the computed time variation is less than a reference time variation in a normal state with no hydrogen leakage.

5. A fuel cell system having fuel cells,
the fuel cell system comprising:
a hydrogen supply unit that feeds a supply of hydrogen to the fuel cells;
a hydrogen supply flow path that connects the hydrogen supply unit to the fuel cells:
a shutoff valve located between the hydrogen supply unit and the hydrogen supply flow path, that shuts off the supply of hydrogen from the hydrogen supply unit into the hydrogen supply flow path;
a pressure regulator that is provided in the hydrogen supply flow path to reduce a pressure of hydrogen supplied from the hydrogen supply unit;
a state quantity measurement unit that measures at least one of a pressure and a flow rate as a state quantity of hydrogen in the hydrogen supply flow path in an upstream direction from the pressure regulator to the shutoff valve and also in the flow path in a downstream direction from the pressure regulator to the fuel cells;
a state control module programmed in a leak detection mode to close the shutoff valve and open the pressure regulator to keep the hydrogen supply flow path in a state with no pressure regulation and make the fuel cell in a leakage detectable state; and
a leakage detection module programmed to analyze in the leakage detectable state a behavior of the state quantity detected by the state quantity measurement unit and accordingly specify occurrence of a hydrogen leakage in the downstream of the hydrogen supply unit,
the fuel cell system further having a pressure sensor that measures a pressure of the hydrogen in the hydrogen supply flow path in the downstream of the pressure regulator,
wherein the state control module is programmed to make the fuel cell system in the leakage detectable state by once opening the shutoff valve to allow the supply of hydrogen into the hydrogen supply flow path, and subsequently closing the shutoff valve when the pressure of the hydrogen in the downstream of the pressure regulator measured by the pressure sensor reaches a preset object value for opening the pressure regulator and keeping the hydrogen supply flow path in the state with no pressure regulation.

6. A fuel cell system having fuel cells,
the fuel cell system comprising:
a hydrogen supply unit that feeds a supply of hydrogen to the fuel cells;
a hydrogen supply flow path that connects the hydrogen supply unit to the fuel cells:
a shutoff valve located between the hydrogen supply unit and the hydrogen supply flow path, that shuts off the supply of hydrogen from the hydrogen supply unit into the hydrogen supply flow path;
a pressure regulator that is provided in the hydrogen supply flow path to reduce a pressure of hydrogen supplied from the hydrogen supply unit;
a state quantity measurement unit that measures at least one of a pressure and a flow rate as a state quantity of hydrogen in the hydrogen supply flow path in an upstream direction from the pressure regulator to the shutoff valve and also in the flow path in a downstream direction from the pressure regulator to the fuel cells;
a state control module programmed in a leak detection mode to close the shutoff valve and open the pressure regulator to keep the hydrogen supply flow path in a state with no pressure regulation and make the fuel cell in a leakage detectable state; and
a leakage detection module programmed to analyze in the leakage detectable state a behavior of the state quantity detected by the state quantity measurement unit and accordingly specify occurrence of a hydrogen leakage in the downstream of the hydrogen supply unit,
the fuel cell system further having a pressure sensor that measures a pressure of the hydrogen in the hydrogen supply flow path in the downstream of the pressure regulator, wherein the state control module is programmed to make the fuel cell system in the leakage detectable state by closing the shutoff valve and consuming the hydrogen in the hydrogen supply flow path until the pressure of the hydrogen in the downstream of the pressure regulator measured by the pressure sensor reaches a preset object value for opening the pressure regulator and keeping the hydrogen supply flow path in the state with no pressure regulation.

7. The fuel cell system in accordance with claim 6, wherein the leakage detection module has a mechanism of activating power generation by the fuel cells to consume the hydrogen in the hydrogen supply flow path.

8. The fuel cell system in accordance with claim 6, wherein the leakage detection module has a mechanism of discharging the hydrogen from the fuel cells to consume the hydrogen in the hydrogen supply flow path.

* * * * *